(12) United States Patent  
Li

(10) Patent No.: US 8,213,190 B2
(45) Date of Patent: Jul. 3, 2012

(54) SINGLE-STAGE ISOLATED HIGH POWER FACTOR AC/DC CONVERTER WITH LEAKAGE INDUCTOR ENERGY RECOVERY FUNCTION

(75) Inventor: Yan-Cun Li, Hsinchu (TW)

(73) Assignee: Macroblock, Inc., Hsinchu (TW)

( * ) Notice: Subject to any disclaimer, the term of this patent is extended or adjusted under 35 U.S.C. 154(b) by 252 days.

(21) Appl. No.: 12/625,644

(22) Filed: Nov. 25, 2009

(65) Prior Publication Data

US 2010/0165669 A1 Jul. 1, 2010

(30) Foreign Application Priority Data

Dec. 31, 2008 (TW) ................................ 97151789 A

(51) Int. Cl.
*H02M 3/335* (2006.01)
*H02M 3/22* (2006.01)
(52) U.S. Cl. ................... 363/21.04; 363/16; 363/89
(58) Field of Classification Search .............. 363/16, 363/17, 20, 21.01, 21.04, 56.09, 56.11, 56.12, 363/97, 89
See application file for complete search history.

(56) References Cited

U.S. PATENT DOCUMENTS

| | | | |
|---|---|---|---|
| 5,570,276 A * | 10/1996 | Cuk et al. ....................... | 363/16 |
| 6,100,644 A | 8/2000 | Titus | |
| 6,147,882 A | 11/2000 | Huber et al. | |
| 6,314,002 B1 * | 11/2001 | Qian et al. ................. | 363/21.04 |
| 6,400,579 B2 * | 6/2002 | Cuk ............................... | 363/16 |
| 6,477,064 B1 * | 11/2002 | Weng et al. ................ | 363/21.04 |
| 6,717,826 B2 | 4/2004 | Noon et al. | |
| 6,751,104 B2 | 6/2004 | Qiao et al. | |
| 6,781,351 B2 * | 8/2004 | Mednik et al. ................ | 323/222 |
| 6,952,354 B1 * | 10/2005 | Yang et al. .................... | 363/16 |
| 7,532,489 B2 * | 5/2009 | Lin et al. ................... | 363/21.04 |

(Continued)

FOREIGN PATENT DOCUMENTS

TW 317394 10/1997

(Continued)

OTHER PUBLICATIONS

K. Jirasereeamornkul et al., A Single Stage Single Switch Power Factor Correction Converter, IEEE, 2001, pp. III-397-III-400, King Mongkut's University of Technology Thonburi, Bangkok.

(Continued)

*Primary Examiner* — Gary L Laxton
(74) *Attorney, Agent, or Firm* — Morris Manning & Martin LLP; Tim Tingkang Xia, Esq.

(57) ABSTRACT

A single-stage isolated high power factor AC/DC converter with a leakage inductor energy recovery function includes a buck-boost circuit, for step-down or step-down a power supply; a transformer, electrically connected to the buck-boost circuit, for transforming the stepped-down or stepped-up power supply; a switch, electrically connected to the buck-boost circuit; an input capacitor, electrically connected to the buck-boost circuit; and an output circuit, for outputting the power supply transformed by the transformer. When the switch is cut off, the buck-boost circuit provides an energy recovery path to return energy stored in a leakage inductor of the transformer to the input capacitor. The energy stored in the leakage inductor of the transformer in a flyback converter or a forward converter is returned to the input capacitor through the energy recovery path. The problem caused by the leakage inductor of the transformer is solved without using any additional element.

13 Claims, 32 Drawing Sheets

U.S. PATENT DOCUMENTS

| | | |
|---|---|---|
| 2003/0227784 A1 | 12/2003 | Qiao et al. |
| 2004/0079953 A1 | 4/2004 | Mednik et al. |
| 2005/0099828 A1 | 5/2005 | Cheng et al. |
| 2006/0214603 A1 | 9/2006 | Oh et al. |

FOREIGN PATENT DOCUMENTS

| | | |
|---|---|---|
| TW | 392389 | 6/2000 |
| TW | 200514341 | 4/2005 |
| TW | M301459 | 11/2006 |
| TW | M304064 | 1/2007 |
| TW | 200742237 | 11/2007 |
| TW | 200812213 | 3/2008 |
| TW | 200816612 | 4/2008 |

OTHER PUBLICATIONS

Wu et al., Analysis and Design of an Isolated Single-Stage Converter Achieving Power-Factor Correction and Fast Regulation, IEEE, 1999, pp. 759-767, vol. 46, No. 4.

Marco A. Dalla Costa et al., A Single-Stage High-Power-Factor Electronic Ballast Based on Integrated Buck Flyback Converter to Supply Metal Halide Lamps, IEEE, 2008, pp. 1112-1122, vol. 55, No. 3.

Moschopoulos et al., Buck-Boost Type Ac-Dc Single-Stage Converters, IEEE, 2006, pp. 1123-1128, Montreal, Quebec, Canada.

Lin et al. Synthesis and Analysis for a Novel Single-Stage Isolated High Power Factor Correction Converter, IEEE, 2005, pp. 1928-1939, vol. 52, No. 9.

* cited by examiner

When the input voltage is low ($V_{in} = V_{in,min}$)

When the input voltage is high ($V_{in} = V_{in,peak}$)

When the input voltage is low ($V_{in} = V_{in,min}$)

When the input voltage is high ($V_{in} = V_{in,peak}$)

US 8,213,190 B2

SINGLE-STAGE ISOLATED HIGH POWER FACTOR AC/DC CONVERTER WITH LEAKAGE INDUCTOR ENERGY RECOVERY FUNCTION

CROSS-REFERENCE TO RELATED APPLICATIONS

This non-provisional application claims priority under 35 U.S.C. §119(a) on Patent Application No(s). 097151789 filed in Taiwan, R.O.C. on Dec. 31, 2008, the entire contents of which are hereby incorporated by reference.

BACKGROUND OF THE INVENTION

1. Field of Invention

The present invention relates to an AC/DC converter, and more particularly to a single-stage isolated high power factor AC/DC converter with a leakage inductor energy recovery function.

2. Related Art

A conventional AC/DC converter generally is the following structure: a boost converter, a buck converter, or a buck-boost converter is used as a first-stage power factor correction (PFC) circuit, and a forward converter or a flyback converter is used as a second-stage driving circuit, so as to achieve electrical isolation and convert an output voltage to a set level, thus providing a stable voltage for driving a load. For the conventional two-stage architecture, two converter circuits with independent control are required, so the circuit cost is high; meanwhile, two power conversion stages also lead to lower circuit efficiency.

FIG. 1 shows a two-stage isolated high power factor AC/DC converter that includes a buck-boost PFC circuit and a flyback converter in the prior art. The two-stage isolated high power factor AC/DC converter is formed by a flyback converter 140 and a buck-boost PFC circuit 130, and includes a filter circuit 110 for filtering an AC power supply Vac. The filter circuit 110 is formed by a filter inductor Lf and a filter capacitor Cf. The filtered power supply is rectified by a rectification circuit 120 formed by diodes Dr1, Dr2, Dr3, and Dr4. The buck-boost PFC circuit 130 is formed by an inductor Lb, a capacitor Cdc, a diode D, and a switch S1. The flyback converter 140 draws energy from the capacitor Cdc through high-frequency switching of a switch S2, and delivers the energy to a secondary side via a transformer T, thus changing the voltage level and achieving the electrical isolation. The buck-boost PFC circuit controls an input current through high-frequency switching of a switch S1, thus achieving the PFC effect. An output rectifier Do and an output capacitor Co are used for filtering.

FIG. 2 shows a two-stage isolated high power factor AC/DC converter that includes a buck-boost PFC circuit and a forward converter in the prior art. Like numbers used in this figure refer to like parts in FIG. 1.

A forward converter 141 draws an energy from a capacitor Cdc through high-frequency switching of a switch S2 and delivers the energy to a secondary side via a transformer, thus changing the voltage level and achieving the electrical isolation. The buck-boost PFC circuit controls an input current through high-frequency switching of a switch S1, thus achieving the PFC effect.

Current PFC circuits operate at a frequency ranging from tens to hundreds of kHz, allow for considerable ranges of variation in the input power supply and load, can inhibit harmonic distortion to almost none, and have an unity power factor. The basic circuit architecture of a DC/DC converter may be classified into six basic types according to relative positions of an energy storage inductor and an active switch, namely, a buck converter, a boost converter, a buck-boost converter, a Cúk converter, a SEPIC converter, and a Zeta converter. Boost and buck-boost circuit architectures are suitable for implementing the PFC. No matter the energy storage inductor operates in a continuous current mode (CCM) or a discontinuous current mode (DCM), the high power factor correction can be achieved. For the same output power, the inductor operating in the DCM has a peak current greater than that in the CCM. The higher the power is, the greater the peak current is, and the switching loss of the circuit also increases accordingly. Therefore, the CCM is suitable for high power output. However, when the inductor operates in the CCM, a control circuit must detect the relations among the input voltage, the inductor current, and the output voltage in real time, so the circuit is complex. In addition, the switching frequency and duty ratio of the switch must be constantly changed in every input voltage cycle. If the PFC circuit and the second-stage converter need to be integrated into the single-stage architecture, the switch elements of the PFC circuit and the second-stage converter must have the same switching frequency and duty ratio. Therefore, when the PFC circuit operates in the CCM, the PFC circuit is not suitable for being integrated with the second-stage converter. In contrast, for the buck-boost PFC converter, if the switching frequency and duty ratio of the switch element thereof are kept constant in every input power supply cycle, the PFC function can be easily achieved when the inductor operates in the DCM.

However, when the flyback converter is used, since a leakage inductor of the transformer is large due to the operating principles and design of the circuit of the flyback converter, much energy is stored in the leakage inductor of the transformer. In FIG. 1, when the active switch S2 of the flyback converter is cut off to deliver the energy to the secondary side of the transformer, there is no way for discharging the energy stored in the leakage inductor at the primary side of the transformer. At this time, a large surge is generated, causing a significant circuit loss, and thus reducing the circuit efficiency. Therefore, in recent years, many researchers are devoted to studying the discharge of the energy stored in the leakage inductor at the primary side of the transformer, and have proposed many methods, for example, a technology such as "active clamp". The active clamp technology is to capture the leakage energy stored in the leakage inductor at the primary side of the transformer by using a clamping capacitor, and then recycle the energy to a load and back to the input end via a system, thus generating a nearly loss-free buffer. As such, the problem caused by the leakage inductor of the flyback converter can be solved and the circuit efficiency can be greatly improved. However, the active clamp technology requires adding at least one active switch and one capacitor, which increases the circuit cost and makes the control complex.

Moreover, since the designs of FIG. 1 and FIG. 2 need two control circuits and two active switches, the circuit cost is further increased.

SUMMARY OF THE INVENTION

In order to improve the current AC/DC converters, such that the AC/DC converters have a high power factor, a high circuit efficiency, fewer circuit elements, and a lower cost, the present invention is directed to a single-stage isolated high power factor AC/DC converter that integrates a buck-boost circuit with a flyback converter or a forward converter, and is further directed to a driving circuit using such a circuit to drive a load (for example, an LED), so as to achieve power factor correction (PFC), improve an efficiency, and reduce a circuit cost. A single-stage converter circuit according to an embodiment of the present invention can return energy stored in a leakage inductor of a transformer in the circuit to an input capacitor, thus improving the conversion efficiency.

A single-stage isolated high power factor AC/DC converter with a leakage inductor energy recovery function is provided, which includes: a buck-boost circuit, for step-down or step-down a power supply; a transformer, electrically connected to the buck-boost circuit, for transforming the stepped-down or stepped-up power supply; a switch, electrically connected to the buck-boost circuit; an input capacitor, electrically connected to the buck-boost circuit; and an output circuit, for outputting the power supply transformed by the transformer. When the switch is cut off, the buck-boost circuit provides an energy recovery path to return energy stored in a leakage inductor of the transformer to the input capacitor.

In the present invention, the energy stored in the leakage inductor of the transformer in a flyback converter or a forward converter is returned to the input capacitor through the energy recovery path. Thus, the problem caused by the leakage inductor of the transformer in the flyback converter or the forward converter can be solved without using any additional element, thus improving the circuit efficiency.

The AC/DC converter circuit according to the embodiment of the present invention not only has the advantage of electrical isolation, but also can meet the requirements in the industry for high power factor, high efficiency, and low cost (by reducing circuit elements).

The AC/DC converter circuit according to the embodiment of the present invention not only meet PFC requirements of safety specifications, but also can achieve functions of electrical isolation (conforming to the safety specifications), multi-winding output, and voltage level adjustment through the transformer, and is applicable to various AC voltages, thus avoiding unstable output when the mains voltage is unstable or suddenly drops. In addition, as the PFC circuit is integrated with the power conversion circuit into the single-stage converter circuit, the circuit structure is simplified and the number of elements used in the circuit is reduced, thus reducing the cost.

According to the embodiment of the present invention, as the PFC circuit is integrated with the power conversion circuit into the single-stage converter circuit, one power conversion stage is omitted, thus improving the conversion efficiency. As compared with a two-stage architecture, the circuit in the single-stage architecture is easy to control, uses two-stage LC filtering, and outputs a very low ripple voltage.

For purposes of summarizing, some aspects, advantages and features of some embodiments of the invention have been described in this summary. Not necessarily all of (or any of) these summarized aspects, advantages or features will be embodied in any particular embodiment of the invention. Some of these summarized aspects, advantages and features and other aspects, advantages and features may become more fully apparent from the following detailed description and the appended claims.

BRIEF DESCRIPTION OF THE DRAWINGS

The appended drawings contain figures of preferred embodiments to further clarify the above and other aspects, advantages and features of the present invention. It will be appreciated that these drawings depict only preferred embodiments of the invention and are not intended to limits its scope. The invention will be described and explained with additional specificity and detail through the use of the accompanying drawings in which.

DETAILED DESCRIPTION OF THE INVENTION

The detailed features and advantages of the present invention are described below in great detail through the following embodiments, the content of the detailed description is sufficient for those skilled in the art to understand the technical content of the present invention and to implement the present invention accordingly. Based upon the content of the specification, the claims, and the drawings, those skilled in the art can easily understand the objectives and advantages of the present invention. The following embodiments are intended to describe the present invention in further detail, but not intended to limit the scope of the present invention in any way.

Figure 1:
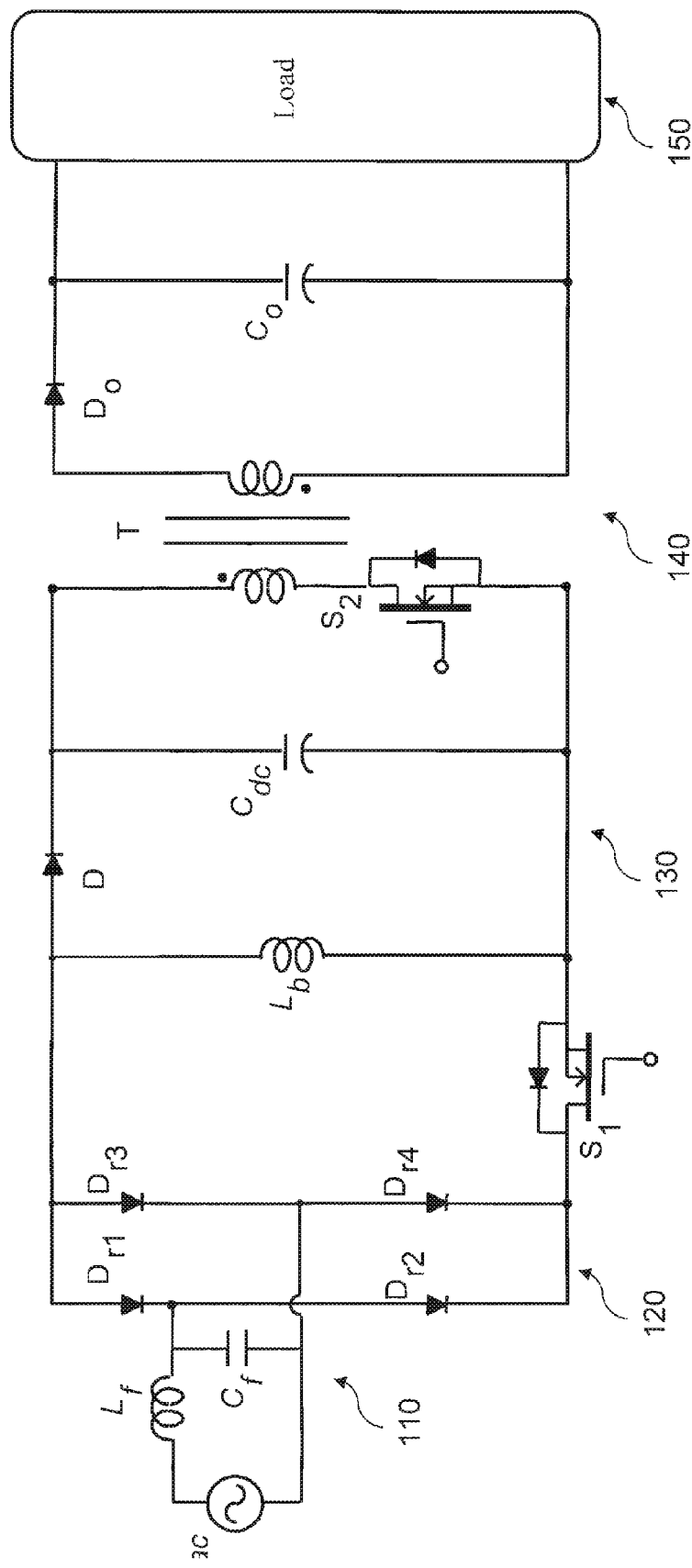
FIG. 1 shows a two-stage isolated high power factor AC/DC converter that includes a buck-boost power factor correction (PFC) circuit and a flyback converter in the prior art.
Figure 2:
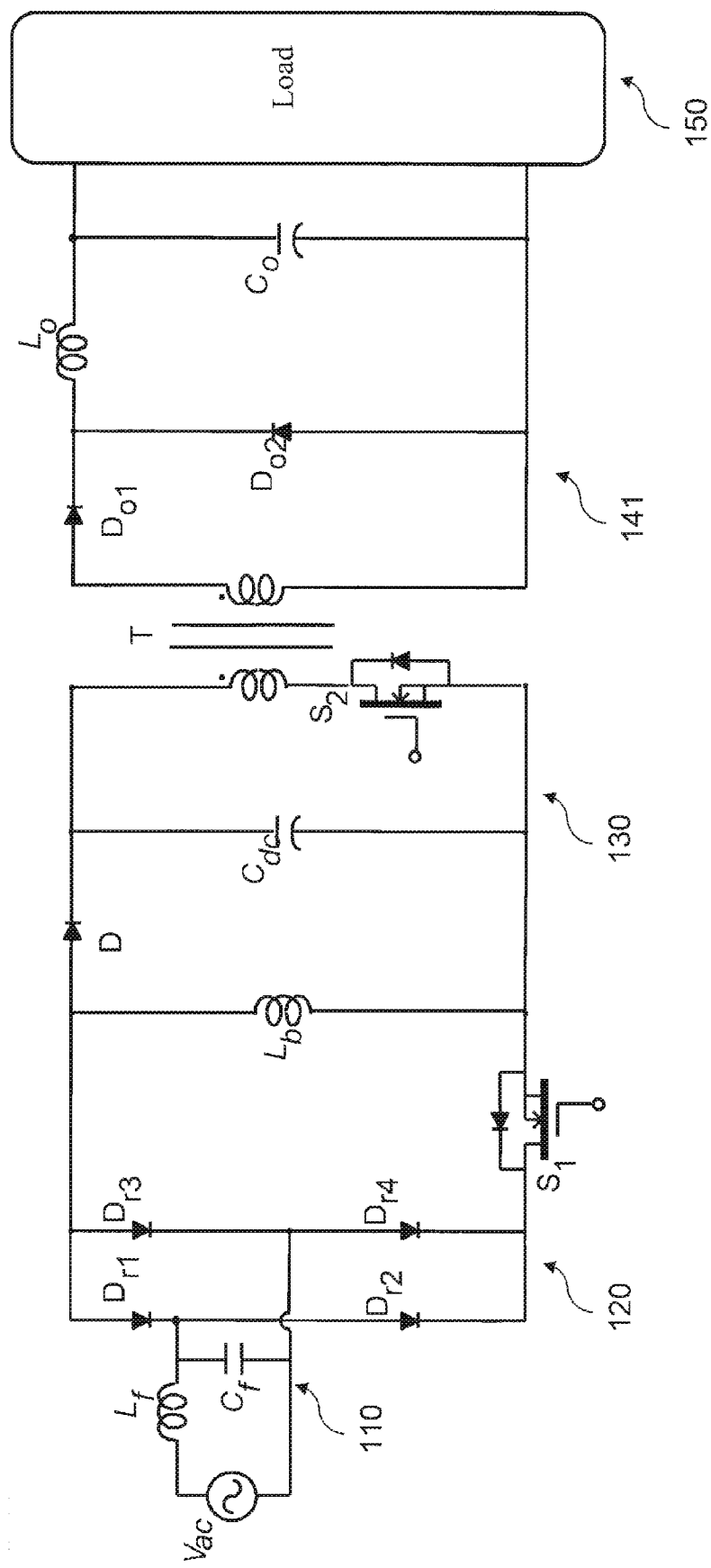
FIG. 2 shows a two-stage isolated high power factor AC/DC converter that includes a buck-boost PFC circuit and a forward converter in the prior art.
Figure 3:
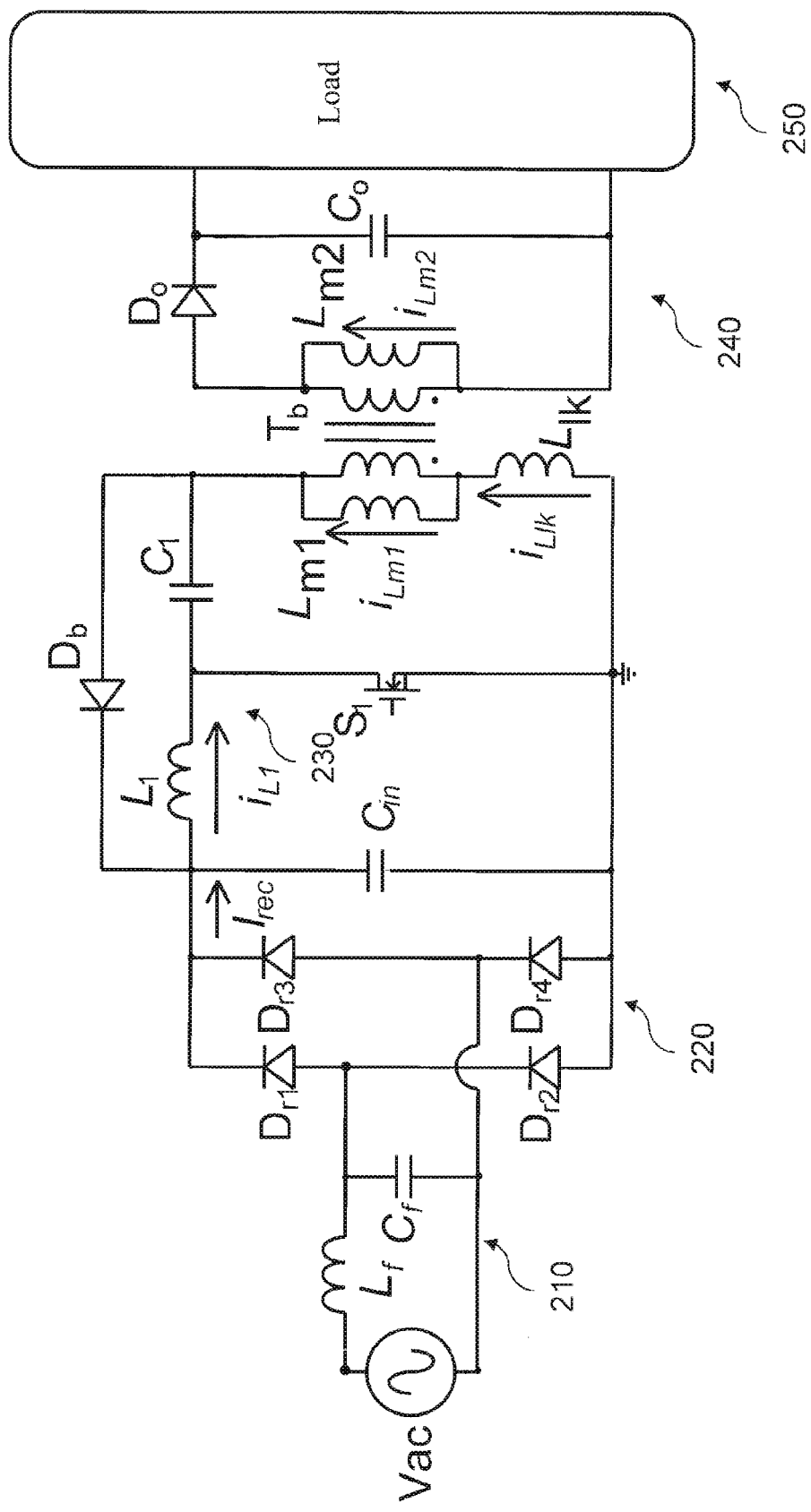
FIG. 3 shows a single-stage isolated high power factor AC/DC converter with a leakage inductor energy recovery function according to an embodiment of the present invention.
Figure 4A:
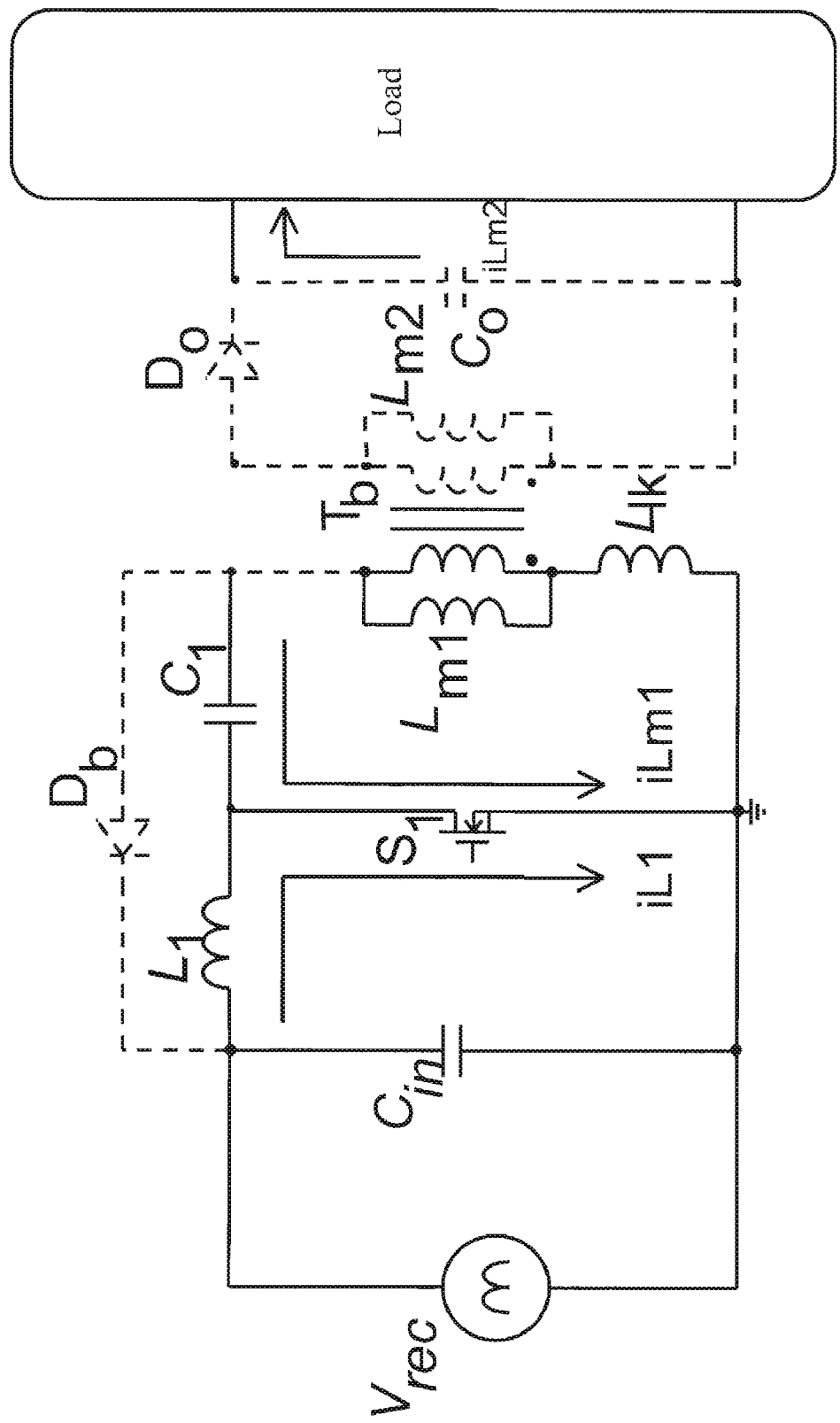
FIG. 4A to FIG. 4E respectively show an equivalent circuit of each operating mode of the single-stage isolated high power factor AC/DC converter with a leakage inductor energy recovery function according to the present invention, in which a buck-boost circuit and a flyback converter both operate in a discontinuous current mode (DCM)
Figure 4B:
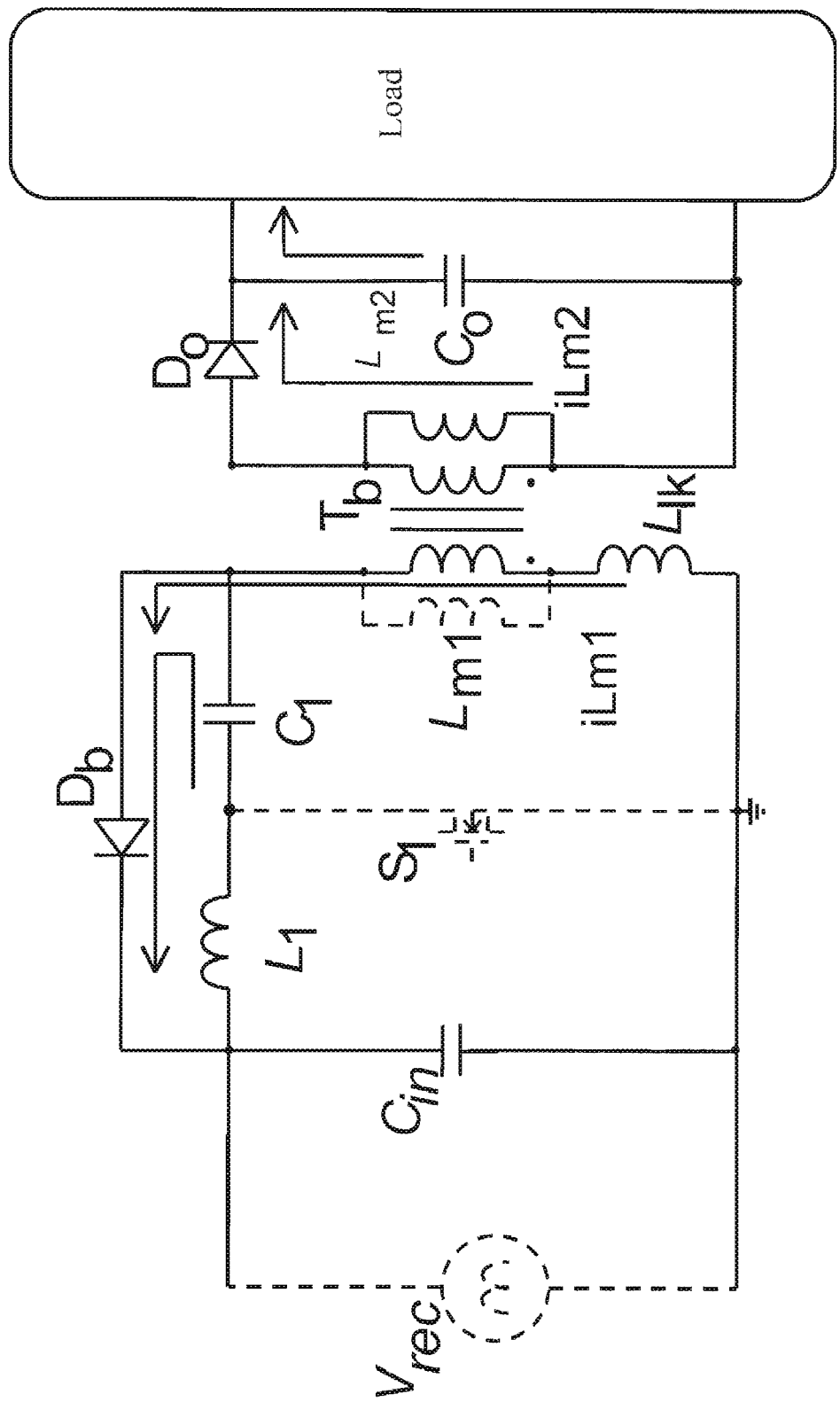
Figure 4C:
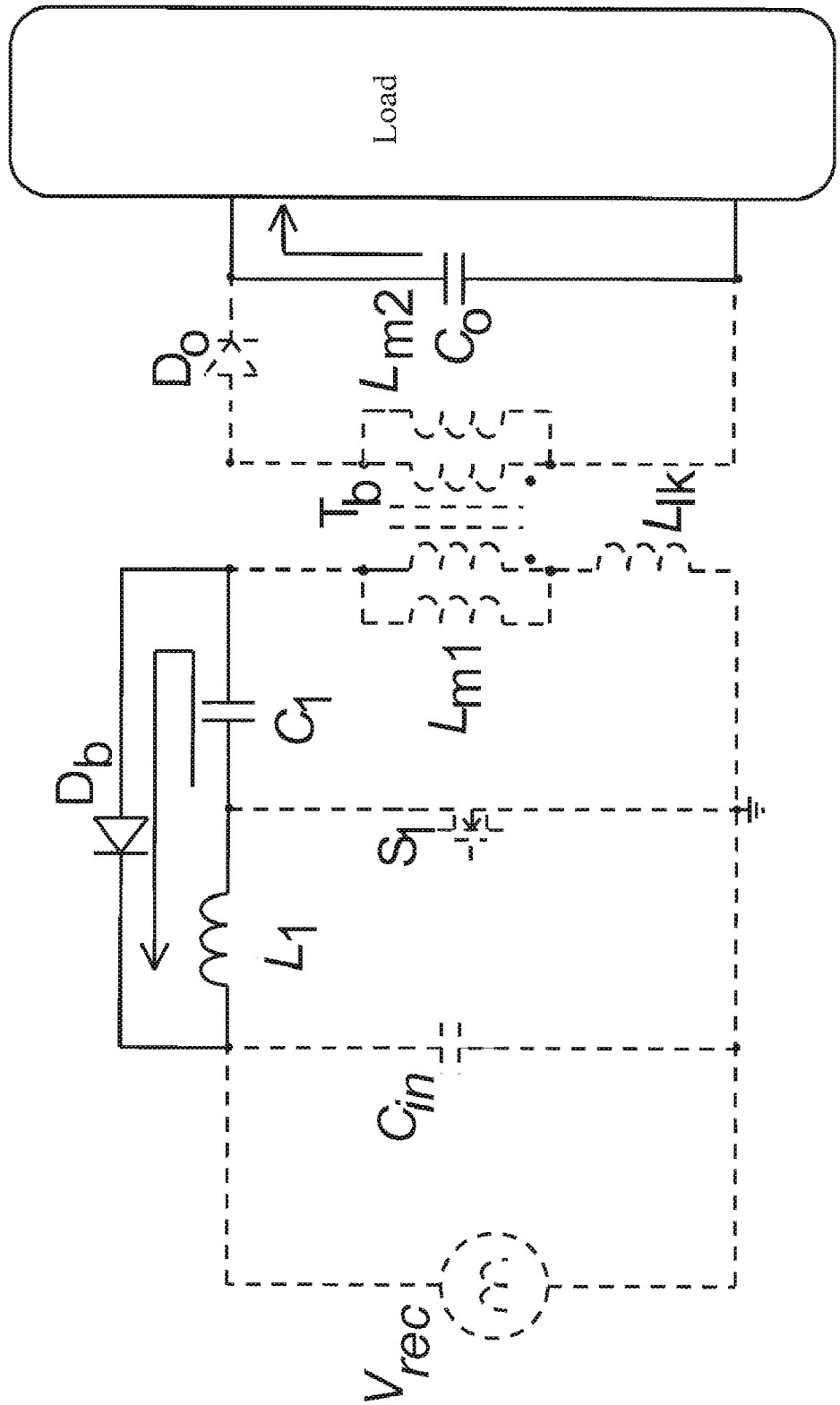
Figure 4D:
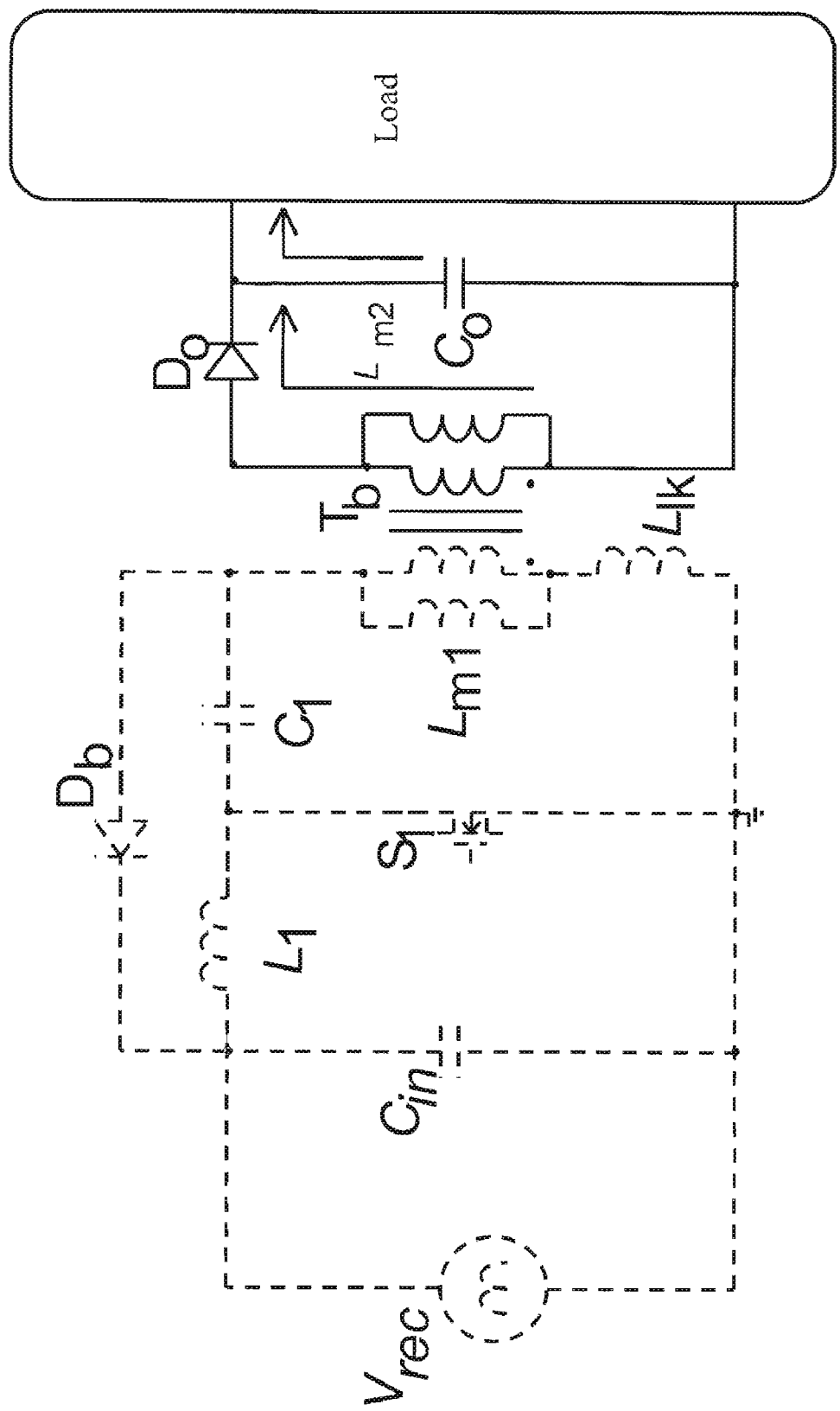
Figure 4E:
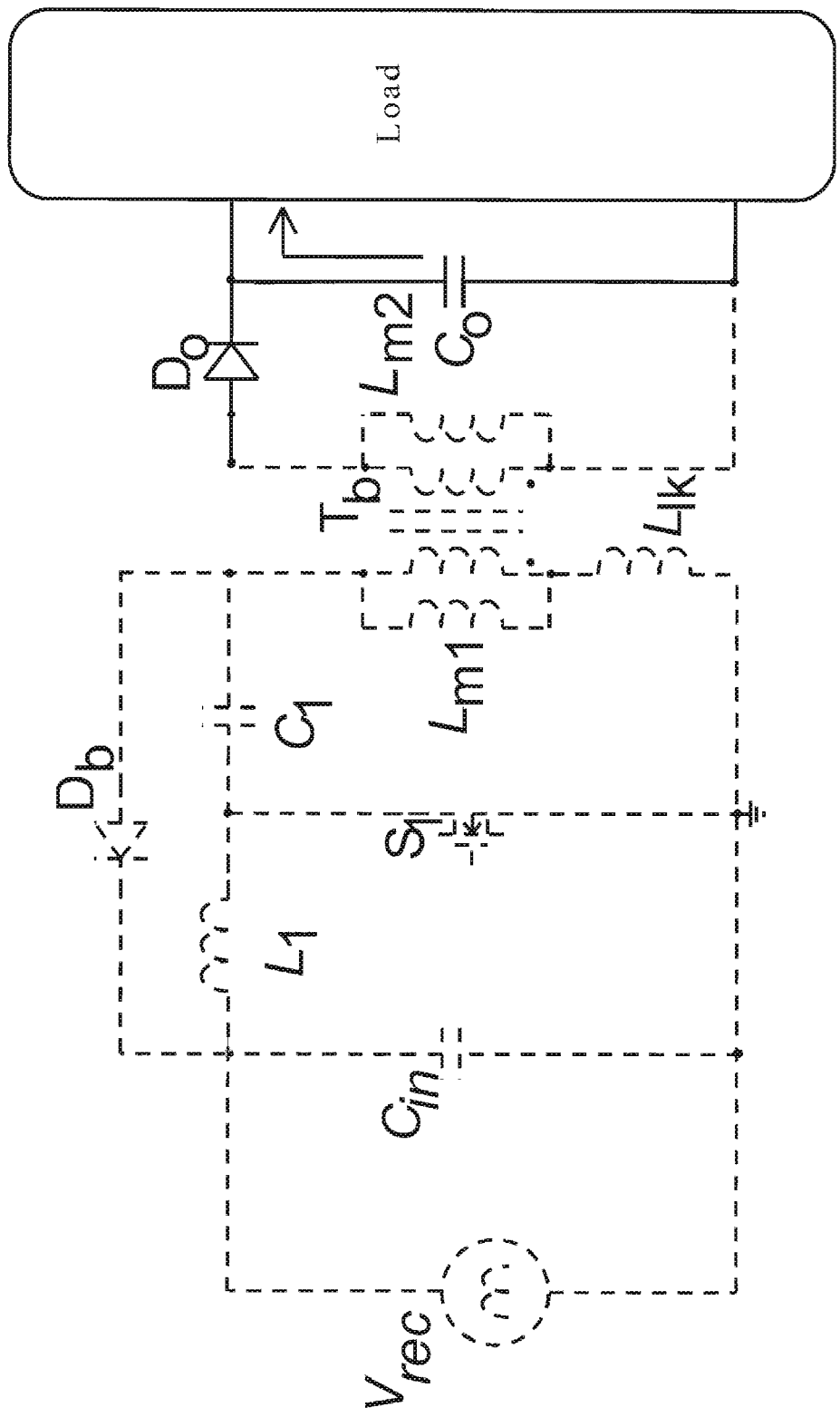

FIG. 3 shows a single-stage isolated high power factor AC/DC converter with a leakage inductor energy recovery function according to the present invention, which is applied to a flyback transformer for driving a load 250. In an exemplary embodiment, the AC/DC converter is formed by a filter circuit 210, a rectification circuit 220, an input capacitor Cin, a buck-boost circuit 230, a switch S1, a transformer Tb, and an output circuit 240. In this embodiment, the switch S1, the transformer Tb, and the output circuit 240 forms a flyback converter.

The buck-boost circuit 230 is used for step-down or step-down a power supply. In this embodiment, the power supply is an AC power supply Vac that is filtered by the filter circuit 210 and then rectified by the rectification circuit 220. The buck-boost circuit 230 is formed by an inductor L1, a capacitor C1, and a rectifier Db. The inductor L1 and the capacitor C1 are serially connected. The rectifier Db is connected to the serially connected inductor L1 and capacitor C1 in parallel. The transformer Tb is electrically connected to the buck-boost circuit 230 for transforming the stepped-down or stepped-up power supply. The switch S1 is electrically connected to the buck-boost circuit 230. The input capacitor Cin is electrically connected to the buck-boost circuit 230. The output circuit 240 is used for outputting the power supply transformed by the transformer Tb to the load 250. When the switch S1 is cut off, the buck-boost circuit 230 provides an energy recovery path to return energy stored in a leakage inductor of the transformer Tb to the input capacitor Cin. The energy recovery path is formed by the rectifier Db. In an embodiment, the rectifier Db may be a diode, and definitely may also be an element suitably configured with a rectification function, such as a BJT, a MOSFET, or an SCR.

The filter circuit 210 is formed by a filter inductor Lf and a filter capacitor Cf, and is used for removing a high-frequency component of an input current of the converter, such that the input current is in the form of a low-frequency sine wave having the same phase as the input voltage.

The rectification circuit 220 is formed by at least one rectifier, and is a full-bridge rectification circuit formed by diodes Dr1-Dr4 in this embodiment. Definitely, other forms of rectification circuits may also be used. In addition to the diodes, the rectification circuit may also be formed by elements such as BJTs, MOSFETs, and SCRs.

Moreover, Lm1 and Lm2 respectively are magnetizing inductors at the primary side and the secondary side of the transformer of the flyback converter. L1$k$ is a total leakage inductor of the transformer of the flyback converter reflected to the primary side.

The output circuit 240 is formed by an output rectifier (for example, a diode) Do and an output capacitor Co. The rectifier Do may also be an element suitably configured with a rectification function, such as a BJT, a MOSFET, or an SCR.

The AC/DC converter of the present invention integrates the buck-boost circuit and the flyback converter, and uses a free-wheeling rectifier of the buck-boost circuit as the energy recovery path. In this embodiment, the free-wheeling rectifier is a common diode (free-wheeling diode) for returning the energy stored in the leakage inductor of the transformer of the flyback converter to the input capacitor. In such a manner, the problem caused by the leakage inductor of the transformer of the flyback converter can be solved without using any additional element, and meanwhile the number of switches needed is also reduced, thus improving the circuit efficiency. In this embodiment, the diode is taken for example for the illustration, and definitely, other elements such as a BJT, a MOSFET, or an SCR may also be used as the rectifier.

Next, the operating principles of the single-stage isolated high power factor flyback AC/DC converter of the present invention will be analyzed. Since the filter inductor Lf and the filter capacitor Cf in the filter circuit 210 are merely used for filtering out the high-frequency component of the input current of the converter and have no effect on the operation of the converter, the analysis thereof is omitted.

Figure 5B:
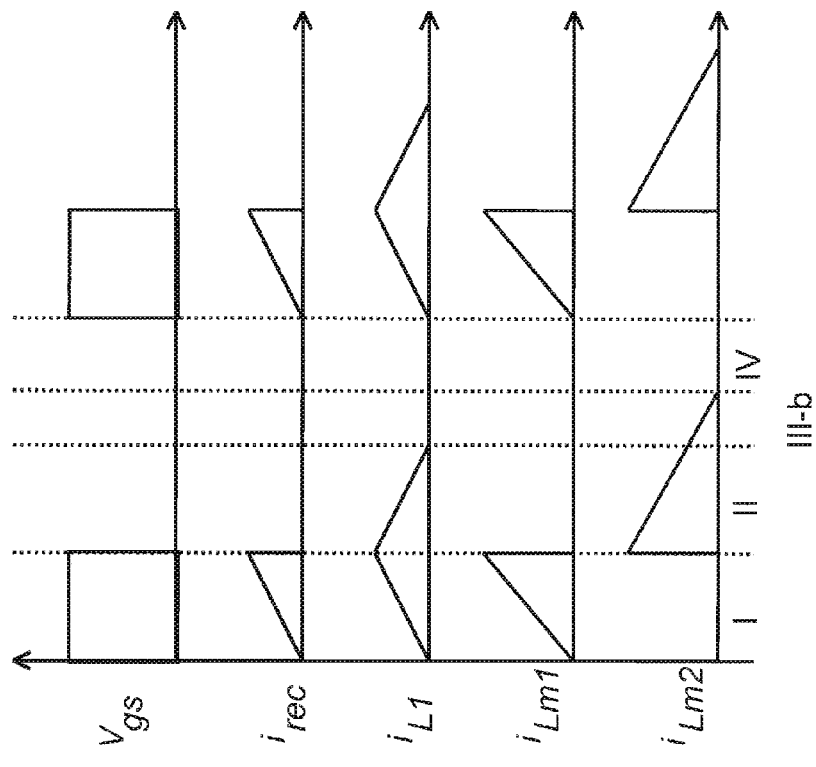
FIG. 5A to FIG. 5B respectively show a theoretical waveform of the single-stage isolated high power factor AC/DC converter with a leakage inductor energy recovery function according to the present invention, in which a buck-boost circuit and a flyback converter both operate in the DCM.
Figure 5A:
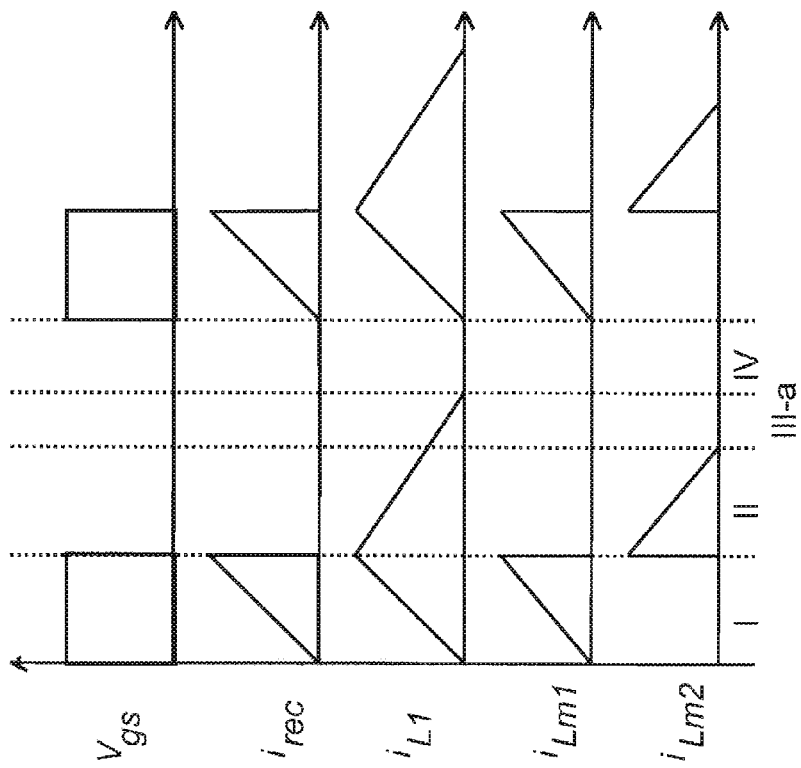

In order to achieve the PFC, the inductor L1 of the buck-boost circuit operates in the DCM, while the flyback converter is not limited to be so, that is, may operate in the DCM or the CCM. When the buck-boost circuit and the flyback converter both operate in the DCM, the circuit may have four operating modes in each high-frequency cycle according to the conducting state of the power switch elements and diodes. An equivalent circuit of each operating mode is as shown in FIG. 4A to FIG. 4E, and theoretical waveforms are as shown in FIG. 5A to FIG. 5B. To simplify the depiction of the circuit, in FIG. 4A to FIG. 4E, Vrec is used to represent the rectified power supply, and the filter inductor Lf, the filter capacitor Cf, and the diodes Dr1, Dr2, Dr3, and Dr4 are not shown. Moreover, for ease of reading, other reference numbers are also omitted, and elements that are not in operation in each mode are represented by dashed lines. Here and in the following specification, Vgs represents the driving signal of the switch S1, and Irec represents the rectified current.

(1) Operating Mode I (the Switch S1 is Turned on):

When the switch S1 is turned on, the rectified input voltage Vrec is applied across the inductor L1, the inductor current iL1 starts to increase linearly from zero, and the increasing rate of the current iL1 is proportional to the input voltage Vrec. Meanwhile, the voltage on the capacitor C1 of the buck-boost circuit is applied across the magnetizing inductor Lm1 at the primary side of the transformer Tb, and the inductor current iLm1 of the primary side also starts to increase linearly from zero. At this time, the inductor current iL1 and the inductor current iLm1 flow through the switch S1 at the same time. At the instant when the switch S1 is cut off, both the inductor current iL1 and the inductor current iLm1 reach peaks of this cycle.

(2) Operating Mode II (the Switch S1 is Cut Off):

When the switch S1 is cut off, the inductor L1 maintains the current path, the energy stored in the inductor L1 is released to the capacitor C1 via the rectifier Db, and the inductor current iL1 starts to drop from the peak. Meanwhile, the flyback converter also couples the energy to the secondary side of the transformer and releases the energy to the output capacitor Co and the load 250, and the coupled inductor current iLm2 of the secondary side also starts to drop from the peak. In addition, at this time, the energy stored in the leakage inductor L1k of the transformer of the flyback converter may also be returned to the input capacitor Cin via the rectifier Db.

As the buck-boost circuit and the flyback converter both operate in the DCM at this time, and the peak of the inductor current iL1 is proportional to the input voltage, the inductor current iL1 may drop to zero earlier or later than the inductor current iLm2. When the inductor current iLm2 drops to zero but the inductor current iL1 does not drop to zero, Operating Mode III-a is entered. When the inductor current iL1 drops to zero but the inductor current iLm2 does not drop to zero, Operating Mode III-b is entered.

(3) Operating Mode III-a (when the Input Voltage is High):

In Operating Mode III-a, the inductor current iLm2 drops to zero in Operating Mode II, and the inductor current iL1 drops continuously. As the inductor L1 operates in the DCM, the inductor current iL1 will drop to zero before the switch S1 is turned on again, and at this time, Operating Mode IV is entered.

(4) Operating Mode III-b (when the Input Voltage is Low):

As the inductor current iL1 has dropped to zero in Operating Mode II, and Lm2 is also designed to operate in the DCM, only the inductor current iLm2 drops continuously at this time. Once the inductor current iLm2 also drops to zero, Operating Mode IV is entered.

(5) Operating Mode IV:

At this time, no current flows through the inductor L1 or the inductor Lm1, and only the output capacitor Co provides the energy to the load 250. When the switch S1 is turned on again, the circuit repeats the operation in Operating Mode I.

Figure 6A:
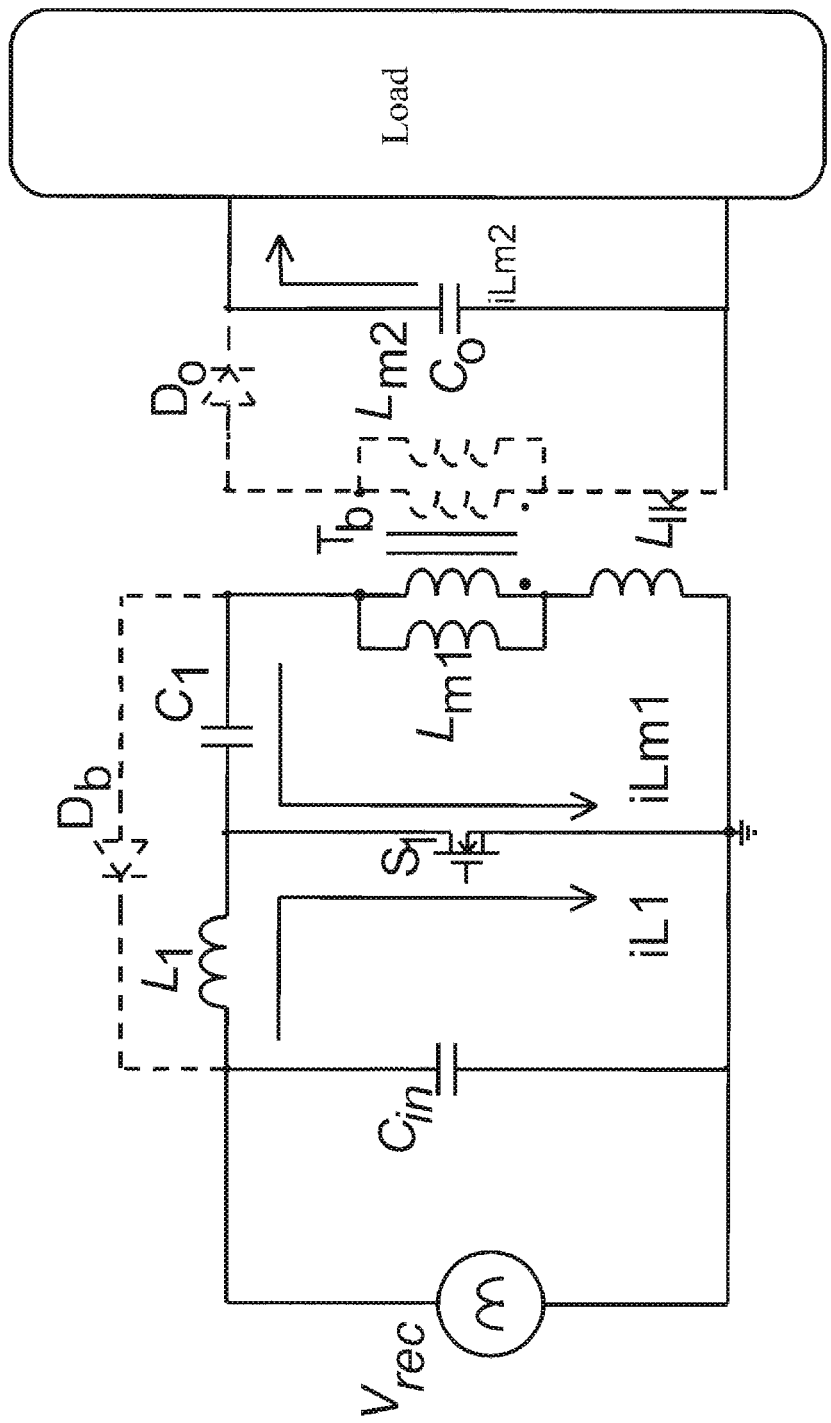
FIG. 6A to FIG. 6C respectively show an equivalent circuit of each operating mode of the single-stage isolated high power factor AC/DC converter with a leakage inductor energy recovery function according to the present invention, in which a buck-boost circuit operates in the DCM and a flyback converter operates in a continuous current mode (CCM)
Figure 6B:
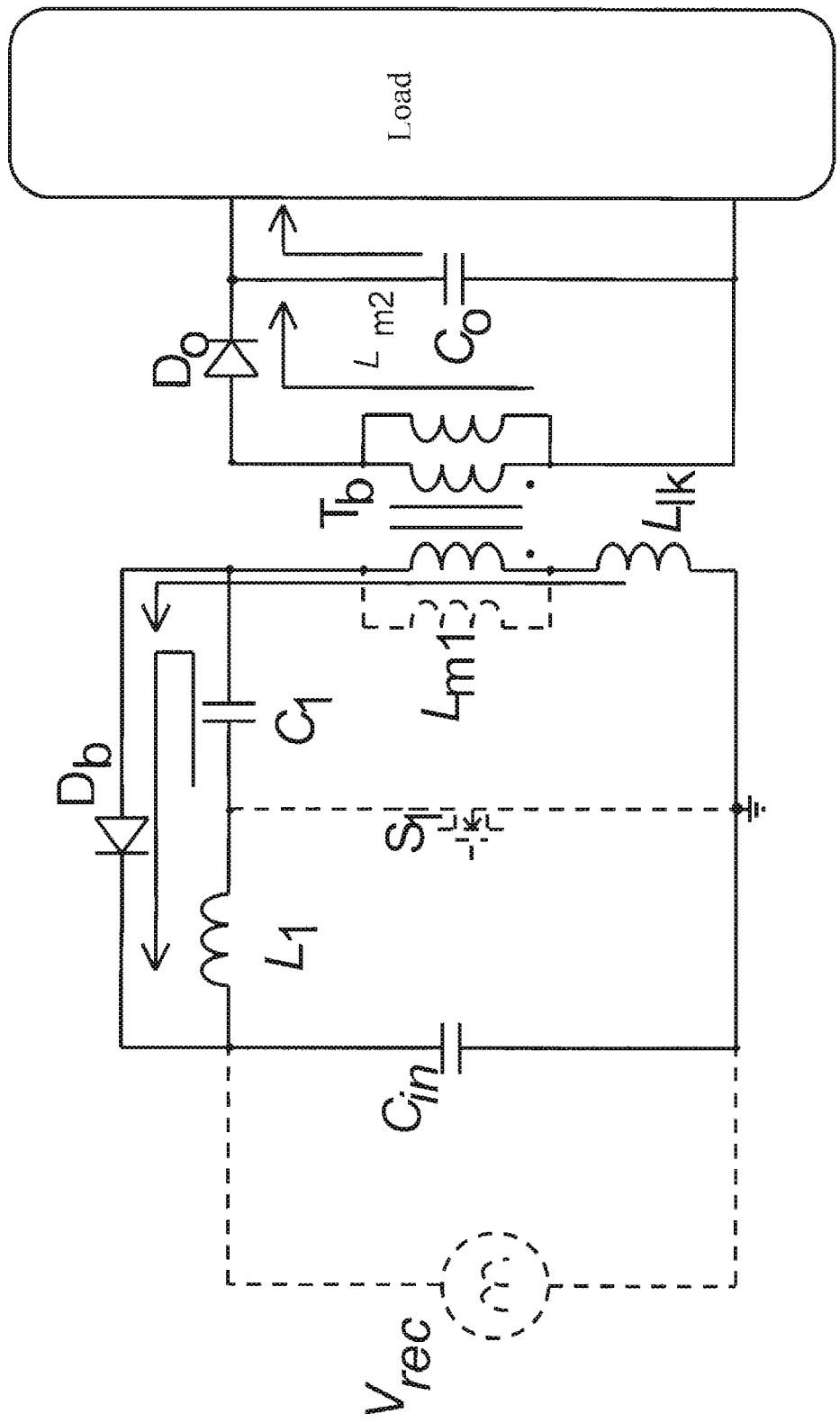
Figure 6C:
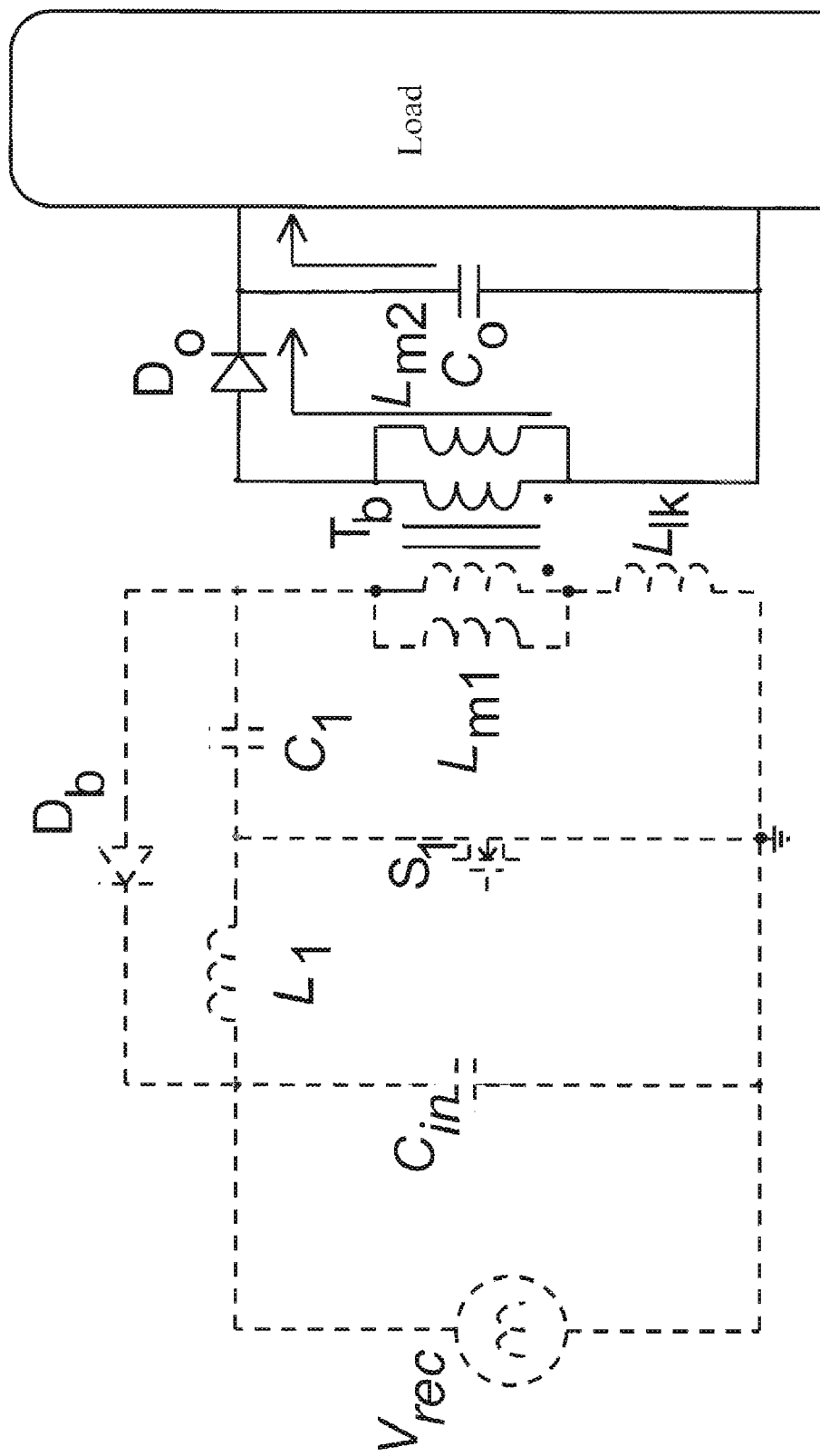
Figure 7:
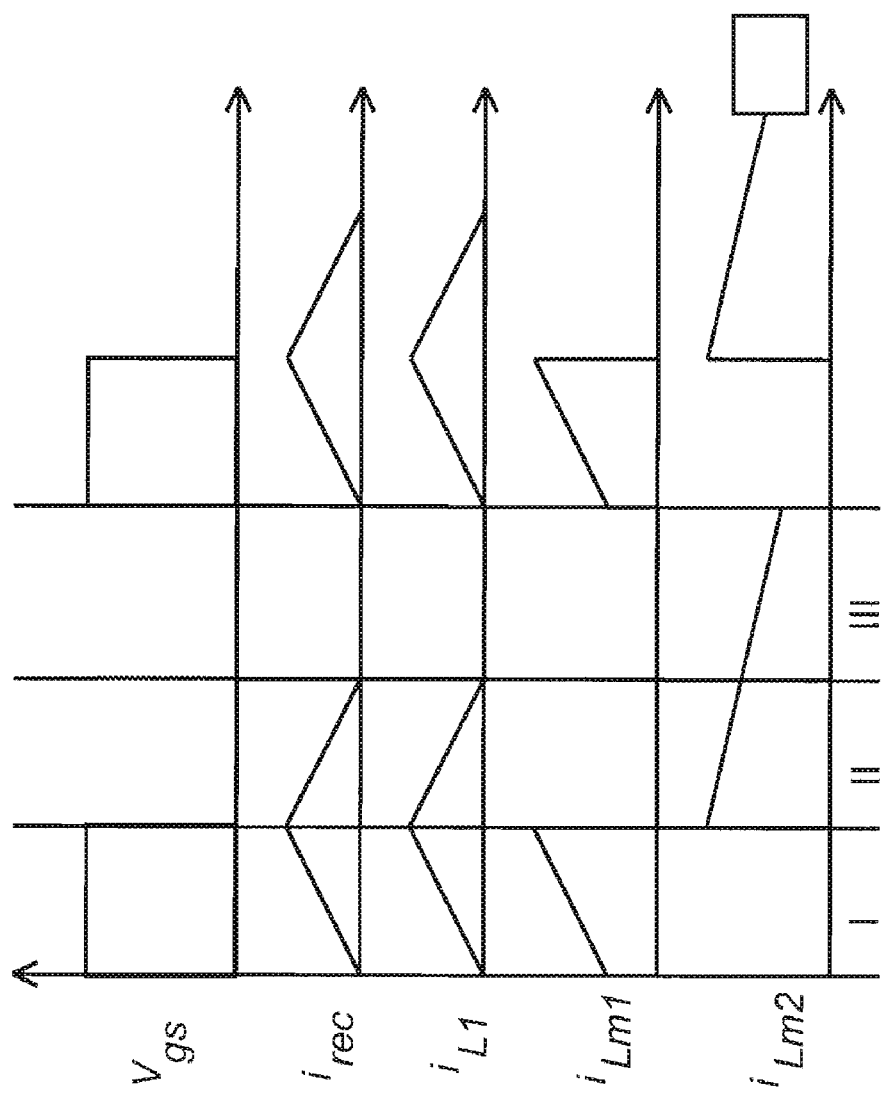
FIG. 7 shows a theoretical waveform of the single-stage isolated high power factor AC/DC converter with a leakage inductor energy recovery function according to the present invention, in which a buck-boost circuit operates in the DCM and a flyback converter operates in the CCM.

When the buck-boost circuit operates in the DCM and the flyback converter operates in the CCM, the circuit may have three operating modes in each high-frequency cycle according to the conducting state of the power switch elements and diodes. An equivalent circuit of each operating mode is as shown in FIG. 6A to FIG. 6C, and a theoretical waveform is as shown in FIG. 7.

(1) Operating Mode I (the Switch $S_1$ is Turned on):

When the switch S1 is turned on, the rectified input voltage Vrec is applied across the inductor L1, the inductor current iL1 starts to increase linearly from zero, and the increasing rate of the inductor current iL1 is proportional to the input voltage. Meanwhile, the voltage on the capacitor C1 of the buck-boost circuit is applied across the magnetizing inductor Lm1 at the primary side of the transformer Tb of the flyback converter, and the inductor current iLm1 of the primary side also starts to increase linearly. At this time, the inductor current iL1 and the inductor current iLm1 flow through the switch S1 at the same time. At the instant when the switch S1 is cut off, both the inductor current iL1 and the inductor current iLm1 reach peaks of this cycle.

(2) Operating Mode II (the Switch S1 is Cut Off):

When the switch S1 is cut off, the inductor L1 maintains the current path, the energy stored in the inductor L1 is released to the capacitor C1 via the rectifier Db, and the inductor current iL1 starts to drop from the peak. Meanwhile, the flyback converter also couples the energy to the secondary side of the transformer Tb and releases the energy to the output capacitor Co and the load 250, and the coupled inductor current iLm2 of the secondary side also starts to drop. In addition, at this time, the energy stored in the leakage inductor of the transformer of the flyback converter may also be returned to the input capacitor Cin via the rectifier Db. As the buck-boost circuit operates in the DCM and the flyback converter operates in the CCM at this time, only the inductor current iL1 will drop to zero. When the inductor current iL1 drops to zero, Operating Mode III is entered.

(3) Operating Mode III (after the Inductor Current iL1 Drops to Zero):

As the inductor current iL1 has dropped to zero in Operating Mode II, the inductor current iLm2 drops continuously at this time. When the switch S1 is turned on again, the circuit repeats the operation of Operating Mode I.

If the buck-boost circuit is designed to operate in the DCM, the anticipated circuit functions (PFC, electrical isolation, voltage level adjustment, and the like) will not be affected, no matter the flyback converter operates in the DCM or the CCM. Moreover, the leakage inductor L1k of the transformer is theoretically far smaller than the magnetizing inductor of the transformer, so the energy stored in the leakage inductor L1k will be released to the input capacitor Cin in a very short time. In a specific embodiment, the energy in the leakage inductor L1k can be completely returned to the input capacitor Cin as long as the off time of the switch S1 is longer than one quarter of the resonant period of the leakage inductor L1k and the input capacitor Cin.

Figure 8A:
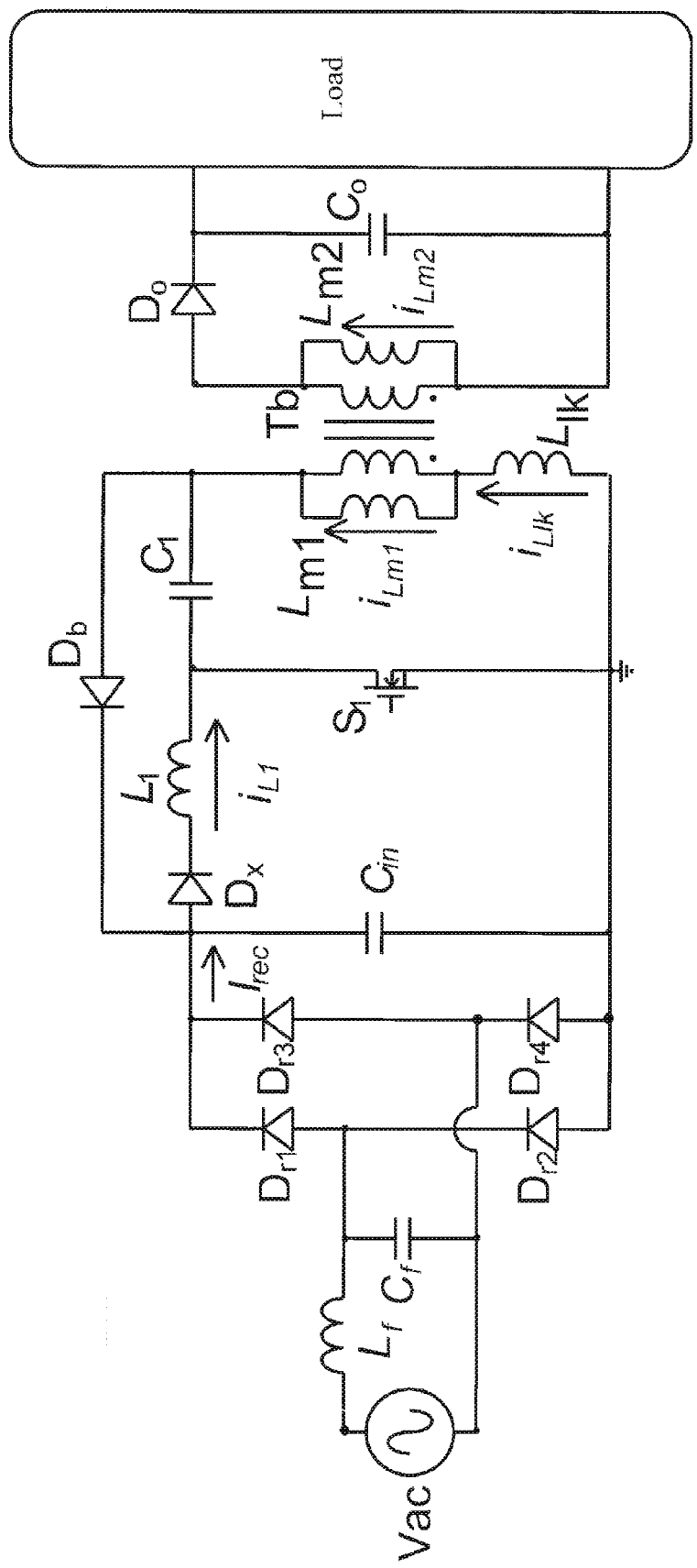
FIG. 8A to FIG. 8B show a single-stage isolated high power factor AC/DC converter with a leakage inductor energy recovery function according to another embodiment of the present invention.
Figure 8B:
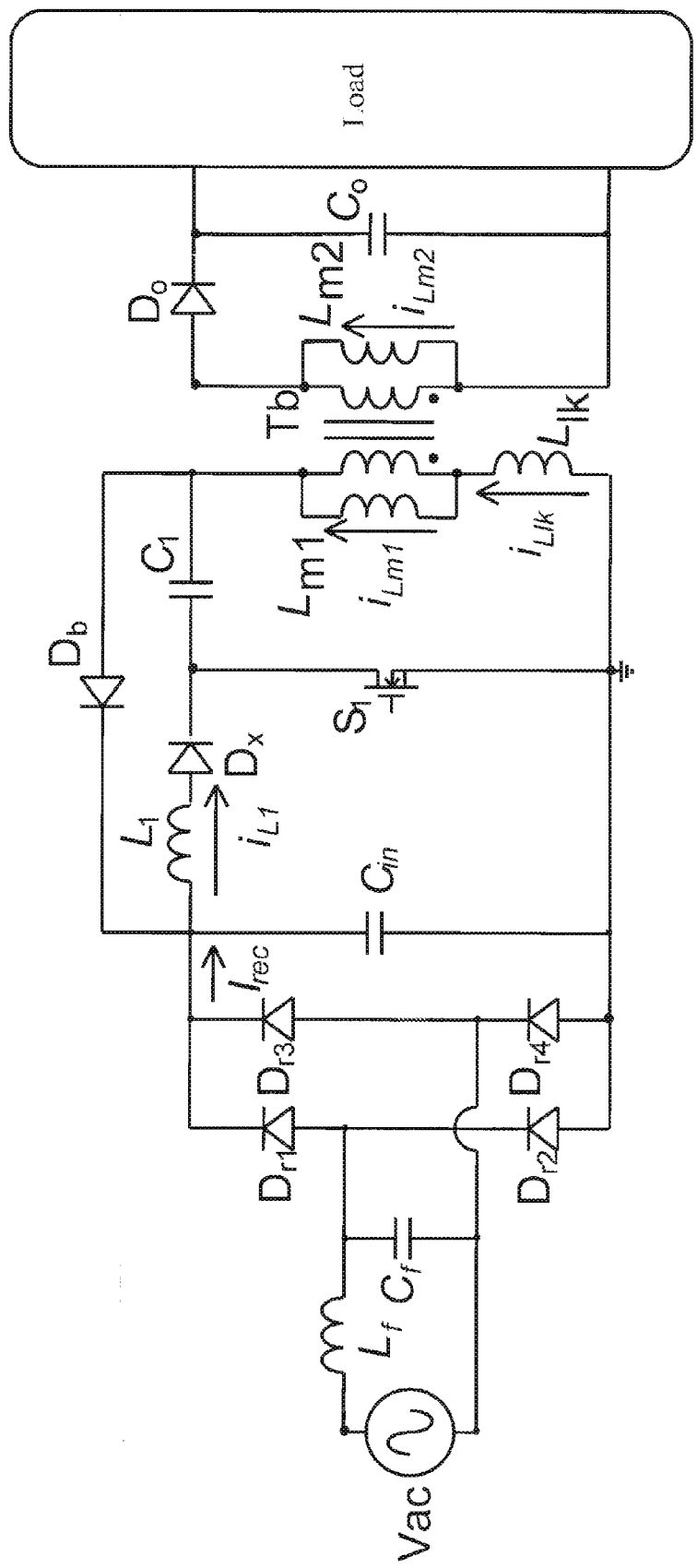

In an embodiment of the present invention, in order to achieve the PFC, the inductor L1 is designed to operate in the DCM, and when the duty ratio of the switch is less than 50%, the voltage on the capacitor C1 may be lower than the input voltage. After the switch is cut off, as the inductor L1 is designed to operate in the DCM, the inductor current iL1 will drop to zero before the switch S1 is turned on again. Once the voltage on the capacitor C1 is higher than the peak of the input voltage, VC1-Vin is reversed across the inductor L1, turning the inductor current iL1 to a negative value, which may lead to an abnormal circuit operation. In this case, a rectifier Dx such as a diode may be serially connected to either side of the inductor L1, as shown in FIG. 8A to FIG. 8B, so as to avoid the possible reversion of the inductor current iL1.

Figure 9A:
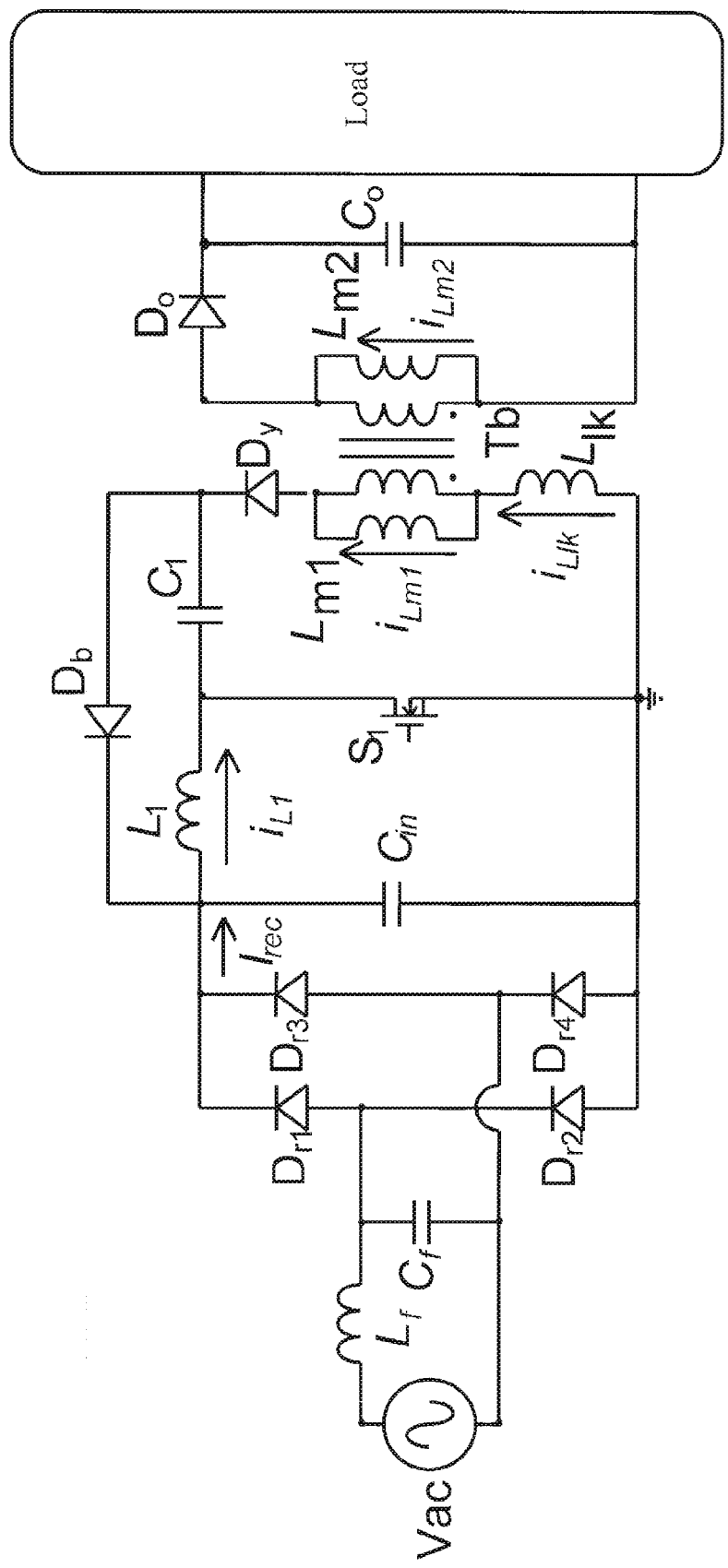
FIG. 9A to FIG. 9B show a single-stage isolated high power factor AC/DC converter with a leakage inductor energy recovery function according to another embodiment of the present invention.
Figure 9B:
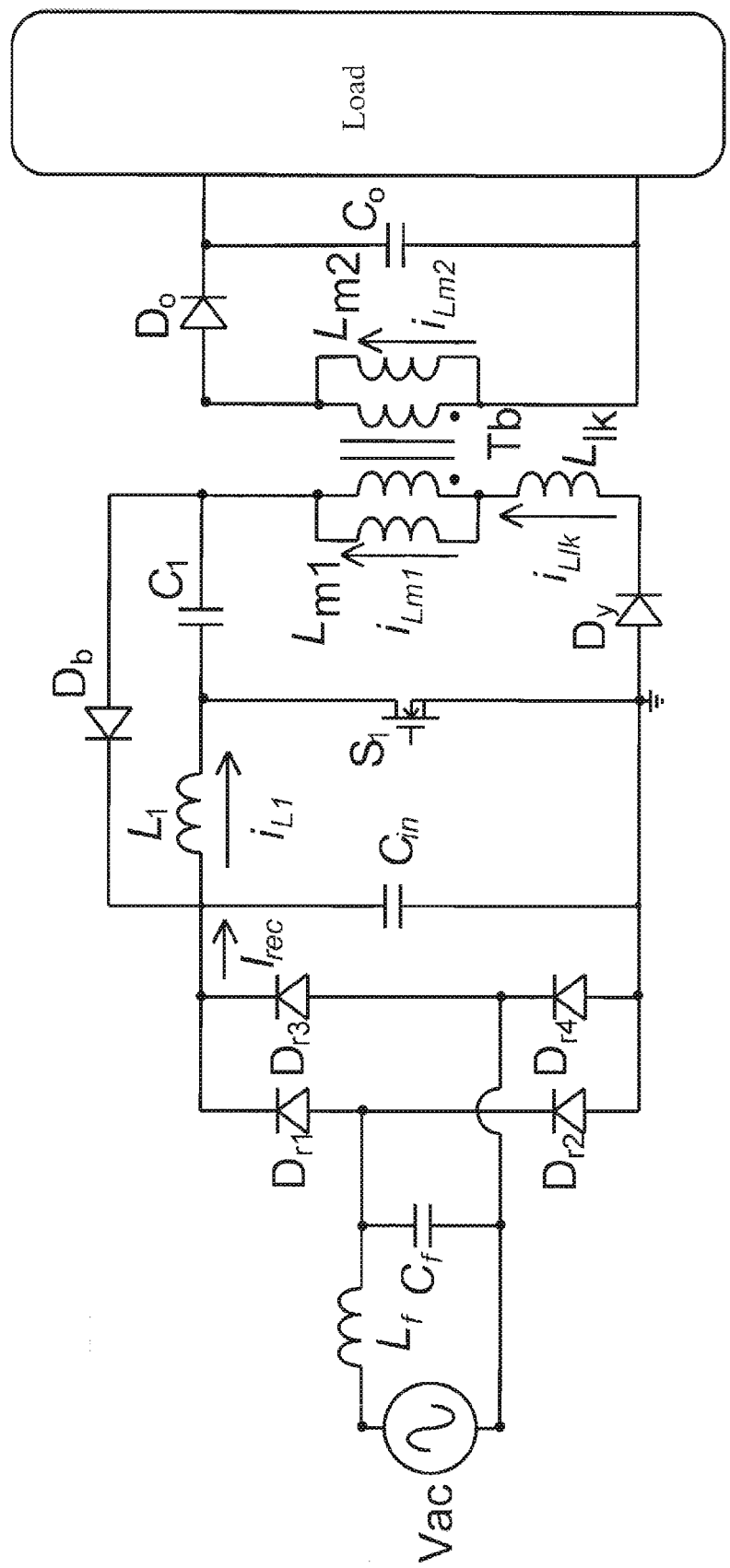

If the flyback converter is designed to operate in the DCM, as the peak of the inductor current iL1 is proportional to the input voltage, the inductor current iL1 may drop to zero earlier or later than the inductor current iL1k. If the inductor current iL1k drops to zero earlier than the inductor current iL1, the inductor current iL1 flows through the rectifier Db and charges the capacitor C1. Once the rectifier Db is turned on, the input voltage Vrec (the rectified input voltage) on the input capacitor Cin is reversed across the primary side of the transformer Tb, turning the inductor current iLm1 to a negative value, which may lead to an abnormal circuit operation. In this case, a rectifier Dy such as a diode may be serially connected to either side of the primary side of the transformer Tb, as shown in FIG. 9A to FIG. 9B, so as to avoid the possible reversion of the inductor current iLm1. In FIG. 8A to FIG. 8B and FIG. 9A to FIG. 9B, the rectifier Dy is serially connected respectively. In another embodiment, either side of the inductor L1 and either side of the primary side of the transformer Tb may also be respectively serially connected to one rectifier at the same time.

Figure 10:
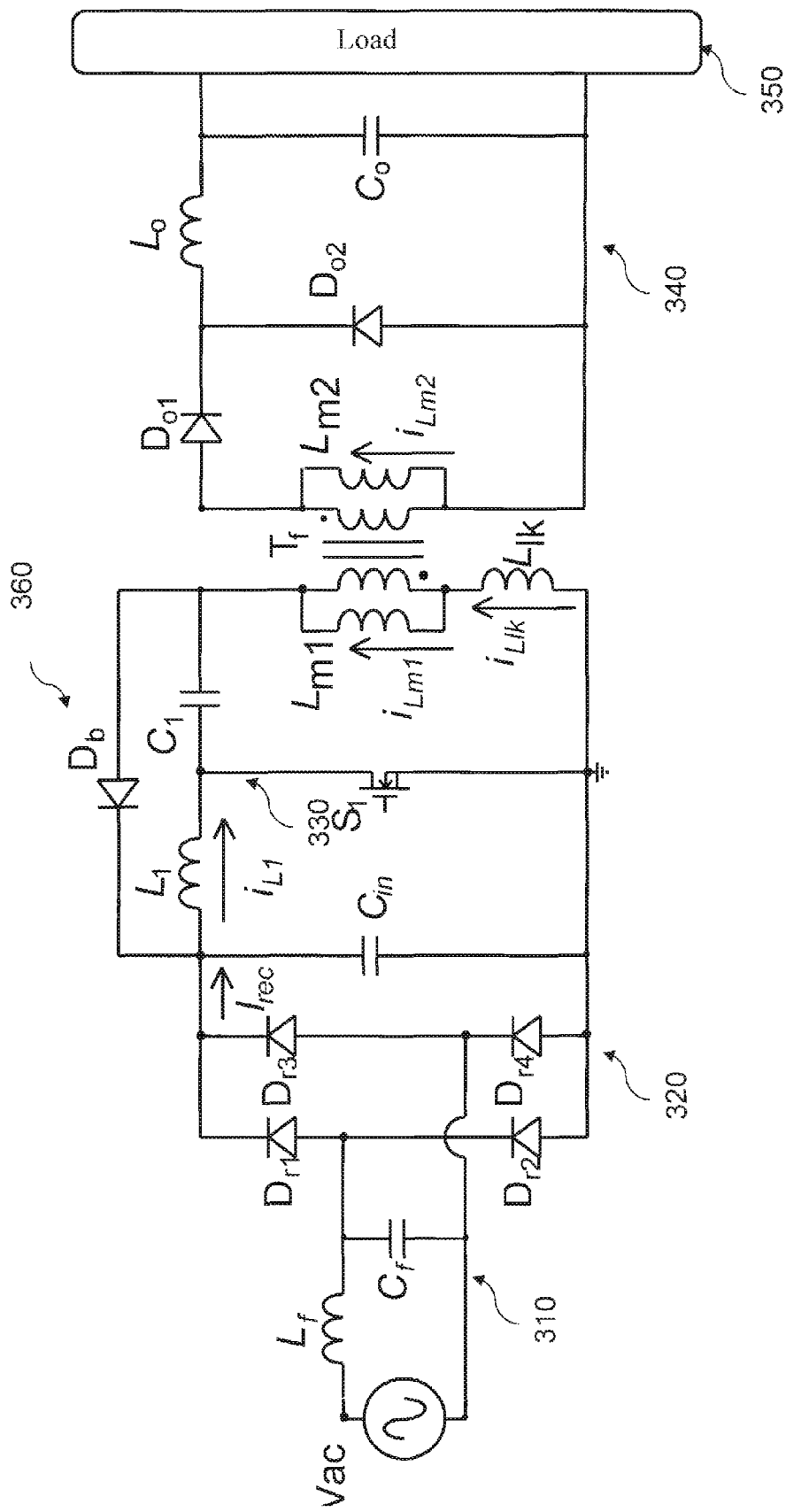
FIG. 10 shows a single-stage isolated high power factor AC/DC converter with a leakage inductor energy recovery function according to another embodiment of the present invention.
Figure 11A:
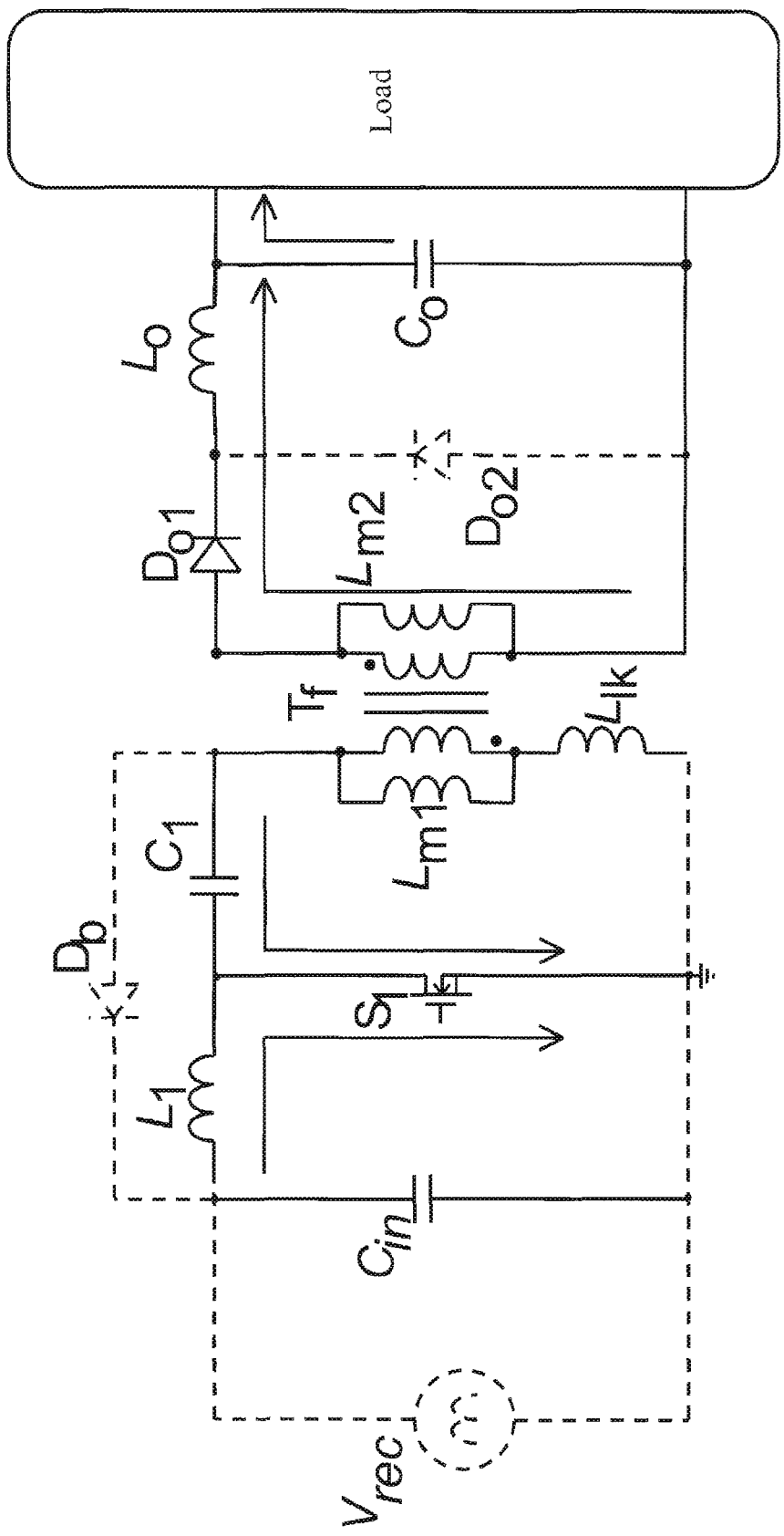
FIG. 11A to FIG. 11E respectively show an equivalent circuit of each operating mode of the single-stage isolated high power factor AC/DC converter with a leakage inductor energy recovery function according to another embodiment of the present invention, in which an inductor of a buck-boost circuit operates in the DCM.
Figure 11B:
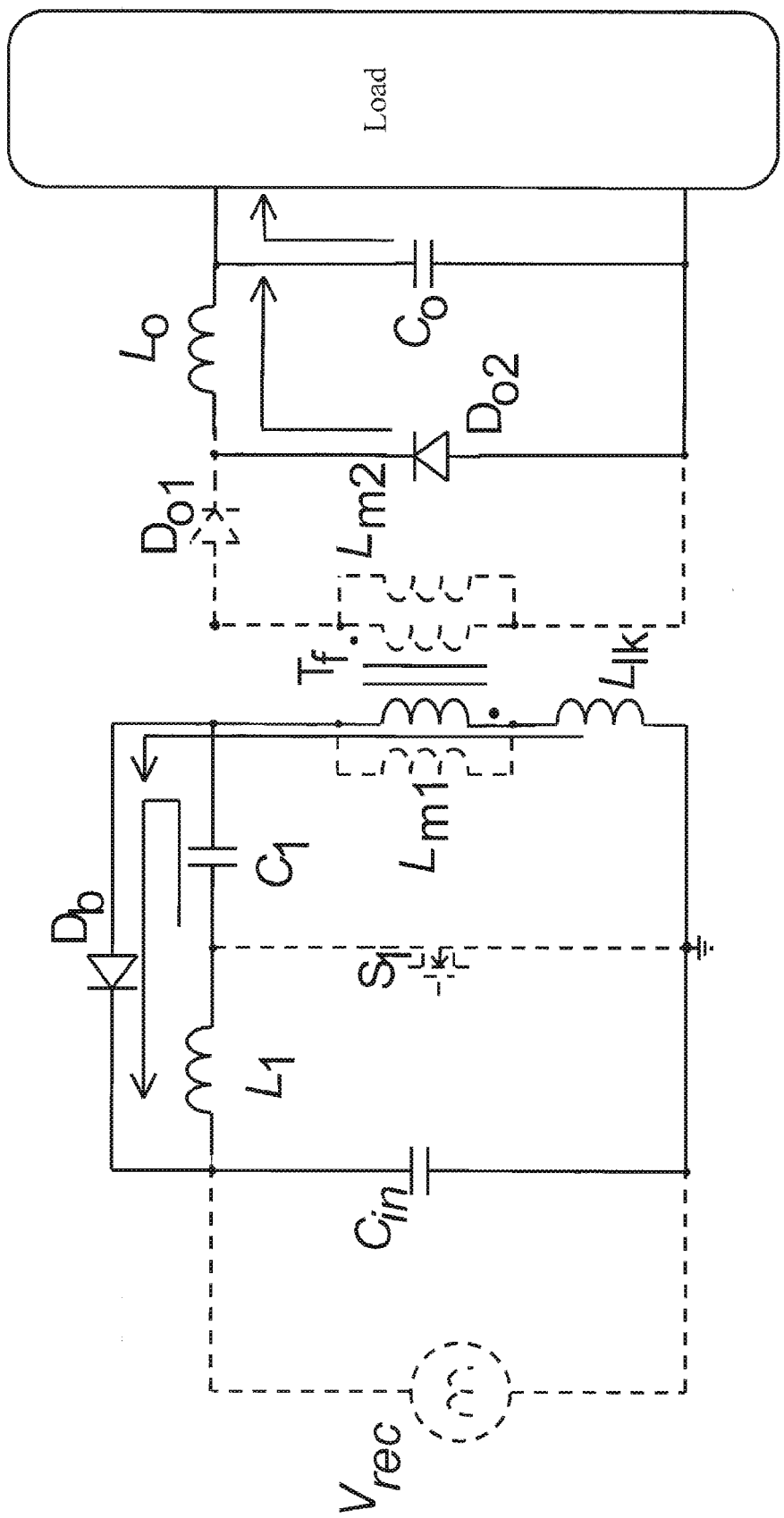
Figure 11C:
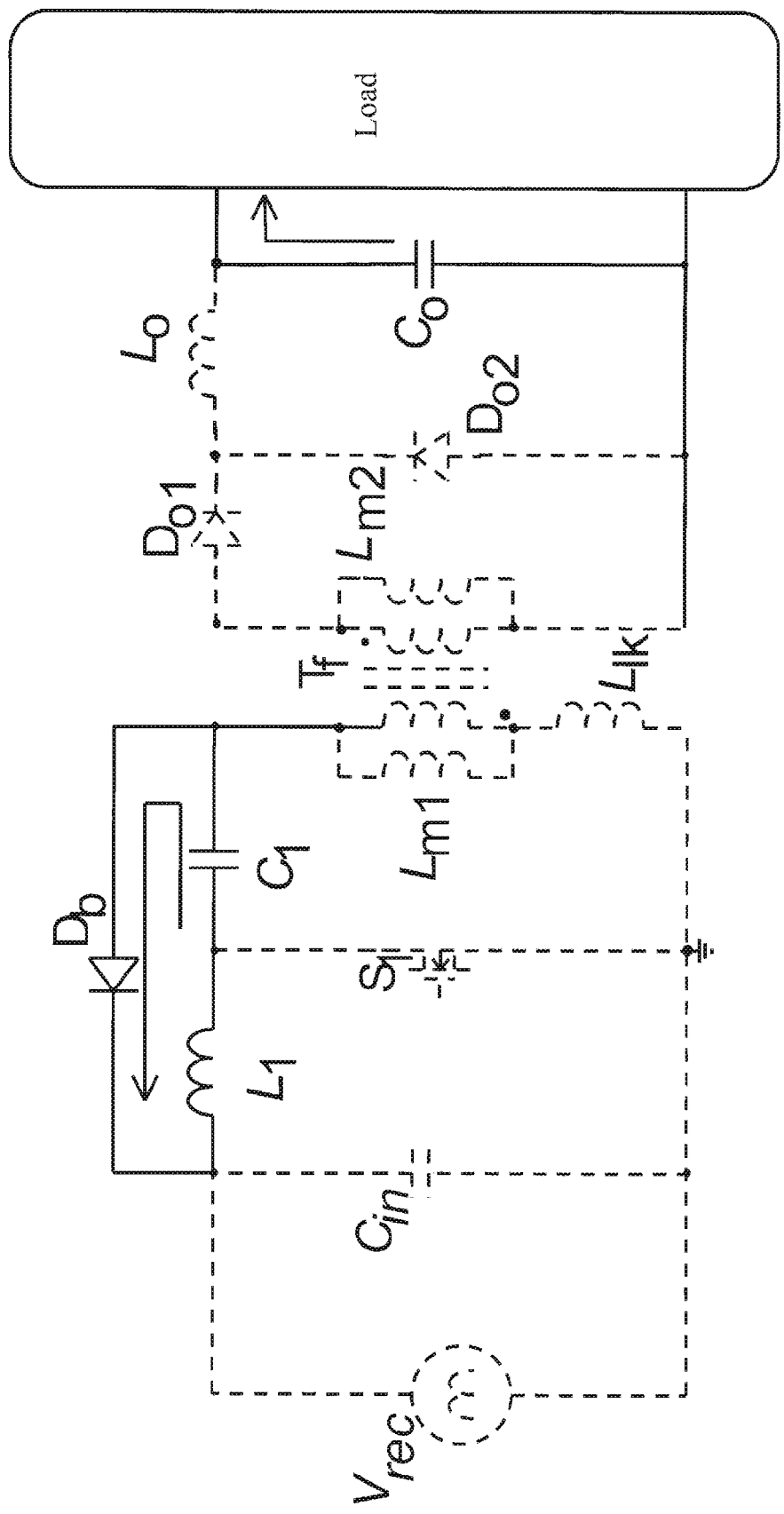
Figure 11D:
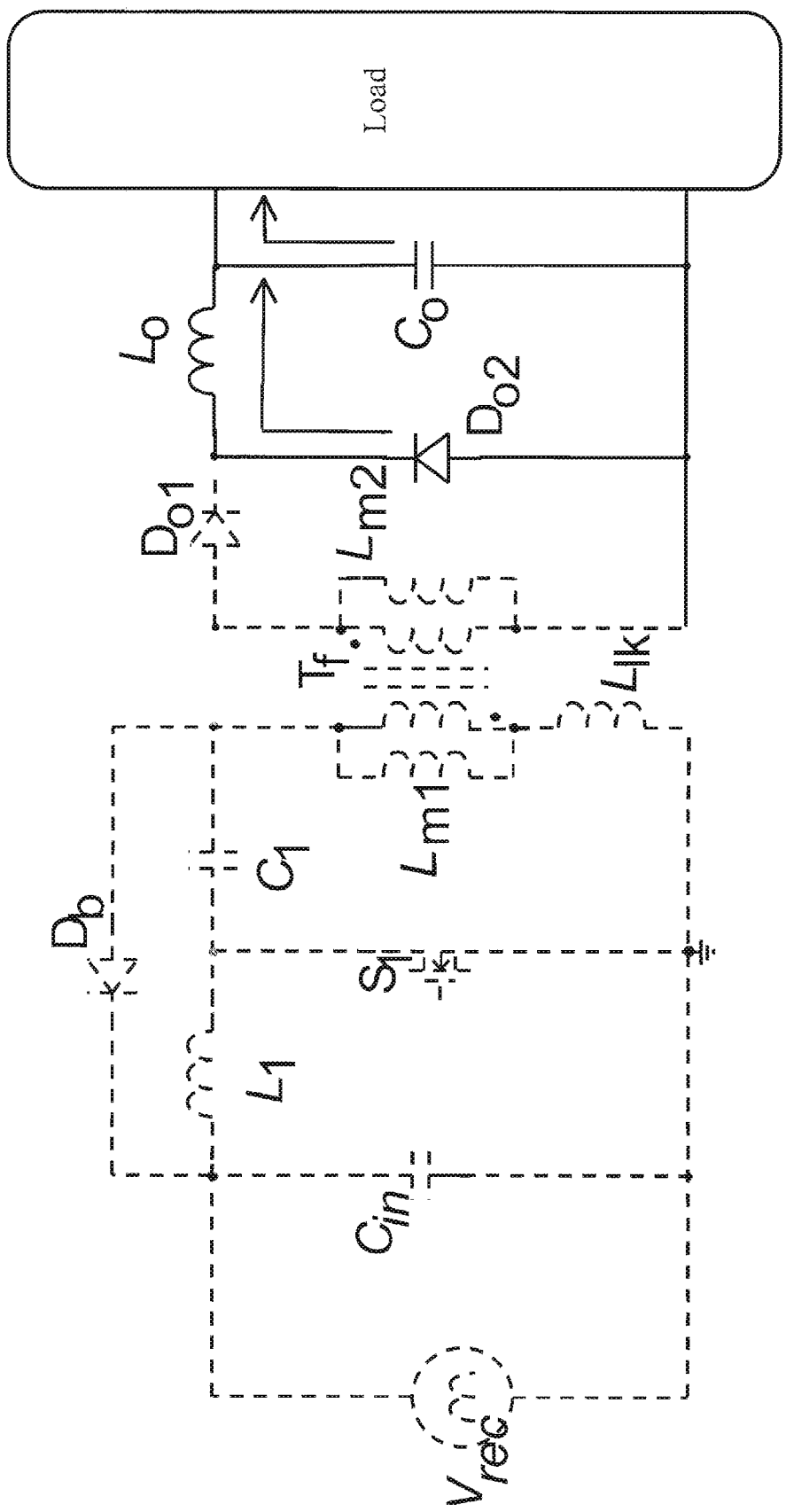
Figure 11E:
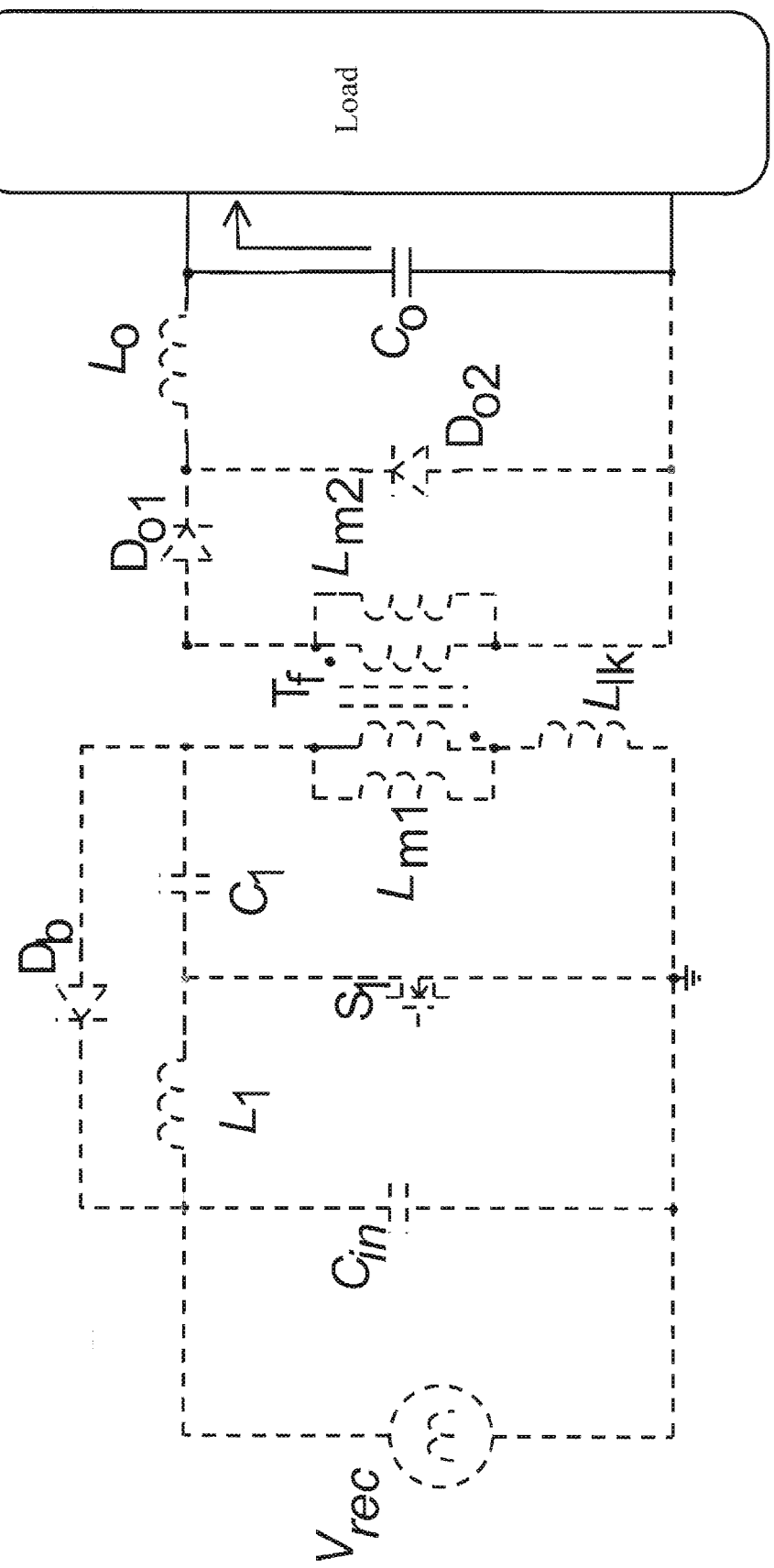

FIG. 10 shows a single-stage isolated high power factor AC/DC converter with a leakage inductor energy recovery function according to the present invention, which is applied to a forward transformer for driving a load 350. In an exemplary embodiment, the AC/DC converter is formed by a filter circuit 310, a rectification circuit 320, an input capacitor Cin, a buck-boost circuit 330, a transformer Tf, and an output circuit 340. In this embodiment, a switch S1, the transformer Tf, and the output circuit 240 form a forward converter.

The buck-boost circuit 330 is used for step-down or step-down a power supply. In this embodiment, the power supply is an AC power supply Vac that is filtered by the filter circuit 310 and then rectified by the rectification circuit 320. The buck-boost circuit 330 is formed by an inductor L1 and a capacitor C1. The transformer Tf is electrically connected to the buck-boost circuit for transforming the stepped-down or stepped-up power supply. The switch S1 is electrically connected to the buck-boost circuit 330. The input capacitor Cin is electrically connected to the buck-boost circuit. The output circuit 340 is used for outputting the power supply transformed by the transformer Tf. When the switch S1 is cut off, the buck-boost circuit 230 provides an energy recovery path to return energy stored in a leakage inductor of the transformer Tf to the input capacitor Cin. The energy recovery path is formed by the rectifier Db. In an embodiment, the rectifier Db may be a diode, and definitely may also be an element suitably configured with a rectification function, such as a BJT, a MOSFET, or an SCR.

The filter circuit 310 is formed by a filter inductor Lf and a filter capacitor Cf, and is used for removing a high-frequency component of an input current of the converter, such that the input current is in the form of a low-frequency sine wave having the same phase as the input voltage.

The rectification circuit 320 is formed by at least one rectifier, and is a full-bridge rectification circuit formed by diodes Dr1-Dr4 in this embodiment. Definitely, other forms of rectification circuits may also be used. In addition to the diodes, the rectification circuit may also be formed by elements such as BJTs, MOSFETs, and SCRs.

Moreover, Lm1 and Lm2 respectively are magnetizing inductors at the primary side and the secondary side of the transformer of the forward converter. L1$k$ is a leakage inductor of the transformer of the forward converter reflected to the primary side.

The output circuit 340 is formed by output rectifiers (for example, diodes) Do1 and Do2, an output inductor Lo and an output capacitor Co. The output rectifiers Do may also be elements suitably configured with a rectification function, such as BJTs, MOSFETs, and SCRs.

Next, the operating principles of the single-stage isolated high power factor forward AC/DC converter of the present invention will be analyzed. Since the filter inductor Lf and the filter capacitor Cf in the filter circuit 310 are merely used for filtering out the high-frequency component of the input current of the converter and have no effect on the operation of the converter, the analysis thereof is omitted.

Figures 12A, 12B:
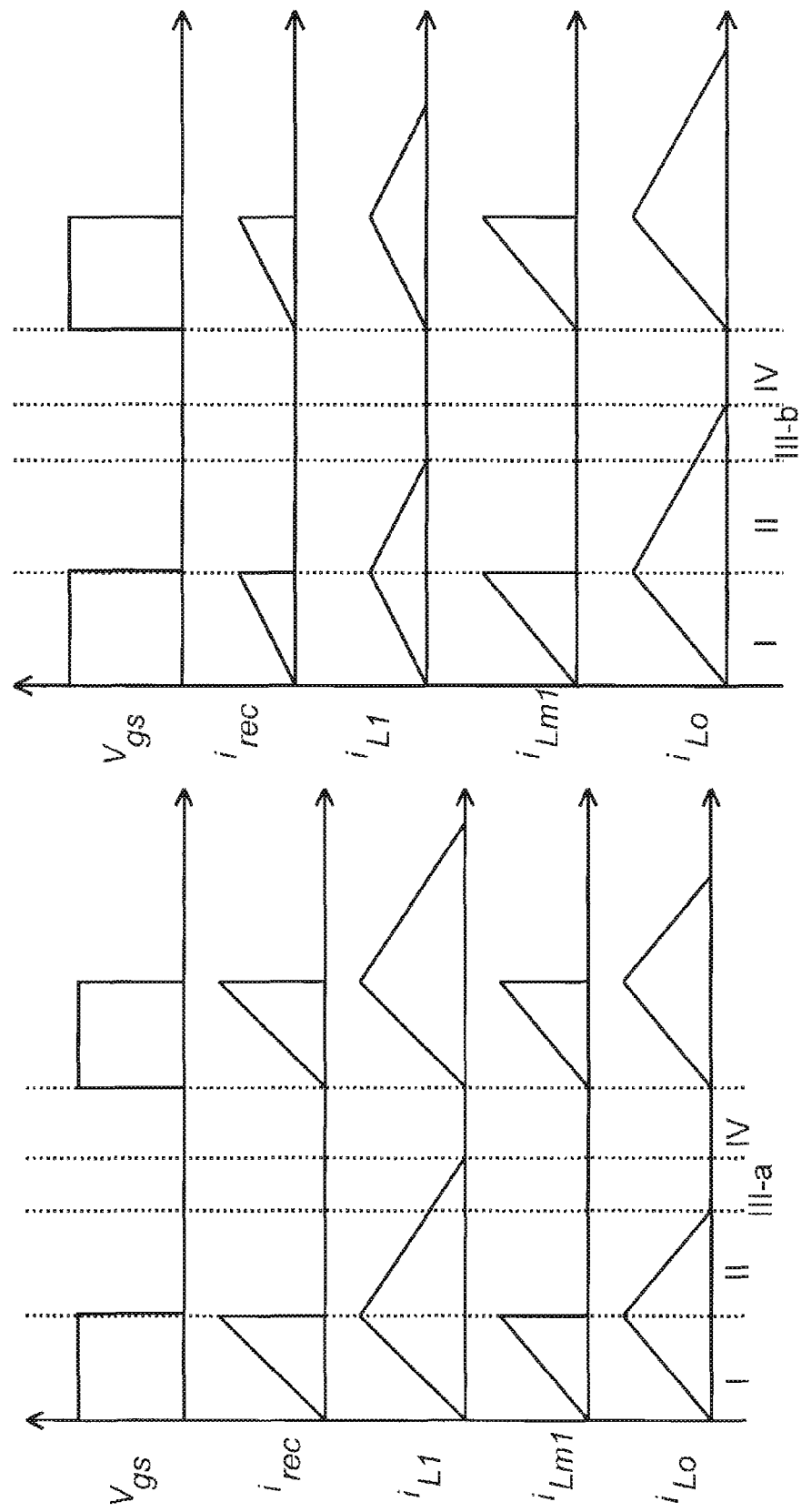
FIG. 12A to FIG. 12B respectively show a theoretical waveform of the single-stage isolated high power factor AC/DC converter with a leakage inductor energy recovery function according to another embodiment of the present invention, in which an inductor of a buck-boost circuit operates in the DCM.

In order to achieve the PFC, the inductor L1 of the buck-boost circuit is designed to operate in the DCM, while the forward converter is not limited to be so, that is, may operate in the DCM or the CCM. When the buck-boost circuit and the forward converter both operate in the DCM, the circuit may have four operating modes in each high-frequency cycle according to the conducting state of the power switch elements and diodes. An equivalent circuit of each operating mode is as shown in FIG. 11A to FIG. 11E, and theoretical waveforms are as shown in FIG. 12A to FIG. 12B.

(1) Operating Mode I (S1 is Turned on):

When the switch S1 is turned on, the rectified input voltage is applied across the inductor L1, the inductor current iL1 starts to increase linearly from zero, and the increasing rate of the inductor current iL1 is proportional to the input voltage Vrec. Meanwhile, the voltage on the capacitor C1 of the buck-boost circuit is applied across the magnetizing inductor Lm1 at the primary side of the transformer Tf of the forward converter, and the energy is coupled to the output inductor Lo and the capacitor Co and the load 350 at the secondary side of the transformer Tf of the forward converter. The inductor current iLo also starts to increase linearly from zero, and meanwhile, the inductor current iLm1 induces a current that is proportional to the inductor current iLo (according to the turns ratio of the transformer) along with the transformer. At this time, the inductor current iL1 and the inductor current iLm1 flow through the switch S1 at the same time. At the instant when the switch S1 is cut off, both the inductor current iL1 and the inductor current iLo (the inductor current iLm1) reach peaks of this cycle.

(2) Operating Mode II (S1 is Cut Off):

When the switch S1 is cut off, the inductor L1 maintains the current path, the energy stored in the inductor L1 is released to the capacitor C1 via the rectifier Db, and the inductor current iL1 starts to drop from the peak. Meanwhile, the output inductor Lo delivers the energy to the output capacitor Co and the load 350 via the output rectifier Do2, and the inductor current iLo also starts to drop from the peak. In addition, at this time, the transformer Tf of the forward converter may also be demagnetized by the rectifier Db, and the energy may be returned to the input capacitor Cin. As the buck-boost circuit and the forward converter both operate in the DCM at this time, and the peak of the inductor current iL1 is proportional to the input voltage, the inductor current iL1 may drop to zero earlier or later than the inductor current iLo. When the inductor current iLo drops to zero but the inductor current iL1 does not drop to zero, Operating Mode III-a is entered. When the inductor current iLo drops to zero but the inductor current iLm2 does not drop to zero, Operating Mode III-b is entered.

(3) Operating Mode III-a (when the Input Voltage is High):

In Operating Mode III-a, the inductor current iLo drops to zero in Operating Mode II, and the inductor current iL1 drops continuously. As the inductor L1 operates in the DCM, the inductor current iL1 will drop to zero before the switch S1 is turned on again, and at this time, Operating Mode IV is entered.

(4) Operating Mode III-b (when the Input Voltage is Low):

As the inductor current iL1 has dropped to zero in Operating Mode II, and the inductor Lo is also designed to operate in the DCM, only the inductor current iLo drops continuously at this time. Once the inductor current iLo also drops to zero, Operating Mode IV is entered.

(5) Operating Mode IV:

At this time, no current flows through the inductor L1 or the output inductor Lo, and only the output capacitor Co provides the energy to the load. When the switch S1 is turned on again, the circuit repeats the operation in Operating Mode I.

Figure 13A:
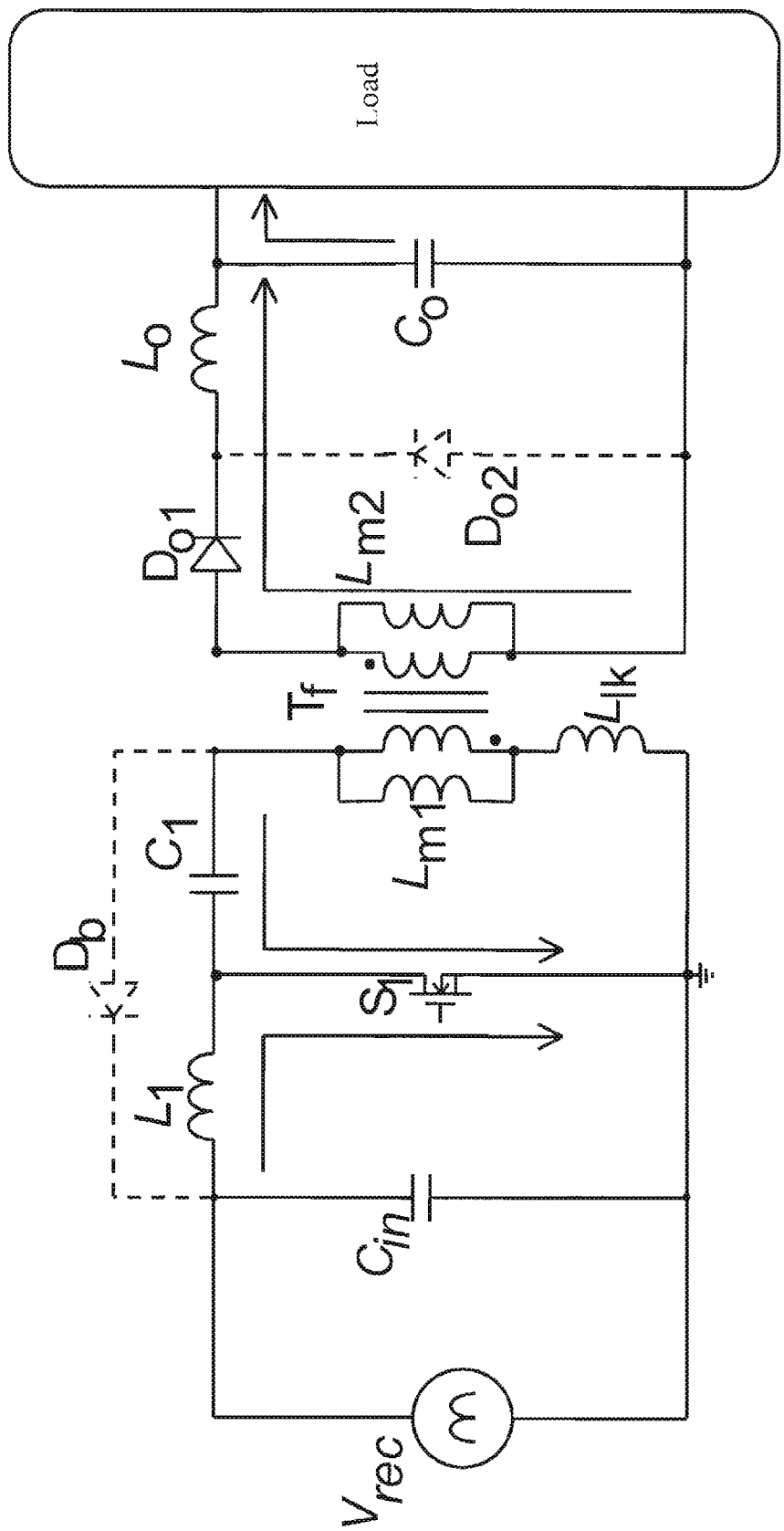
FIG. 13A to FIG. 13C respectively show an equivalent circuit of each operating mode of the single-stage isolated high power factor AC/DC converter with a leakage inductor energy recovery function according to another embodiment of the present invention, in which a buck-boost circuit operates in the DCM and a forward converter operates in the CCM.
Figure 13B:
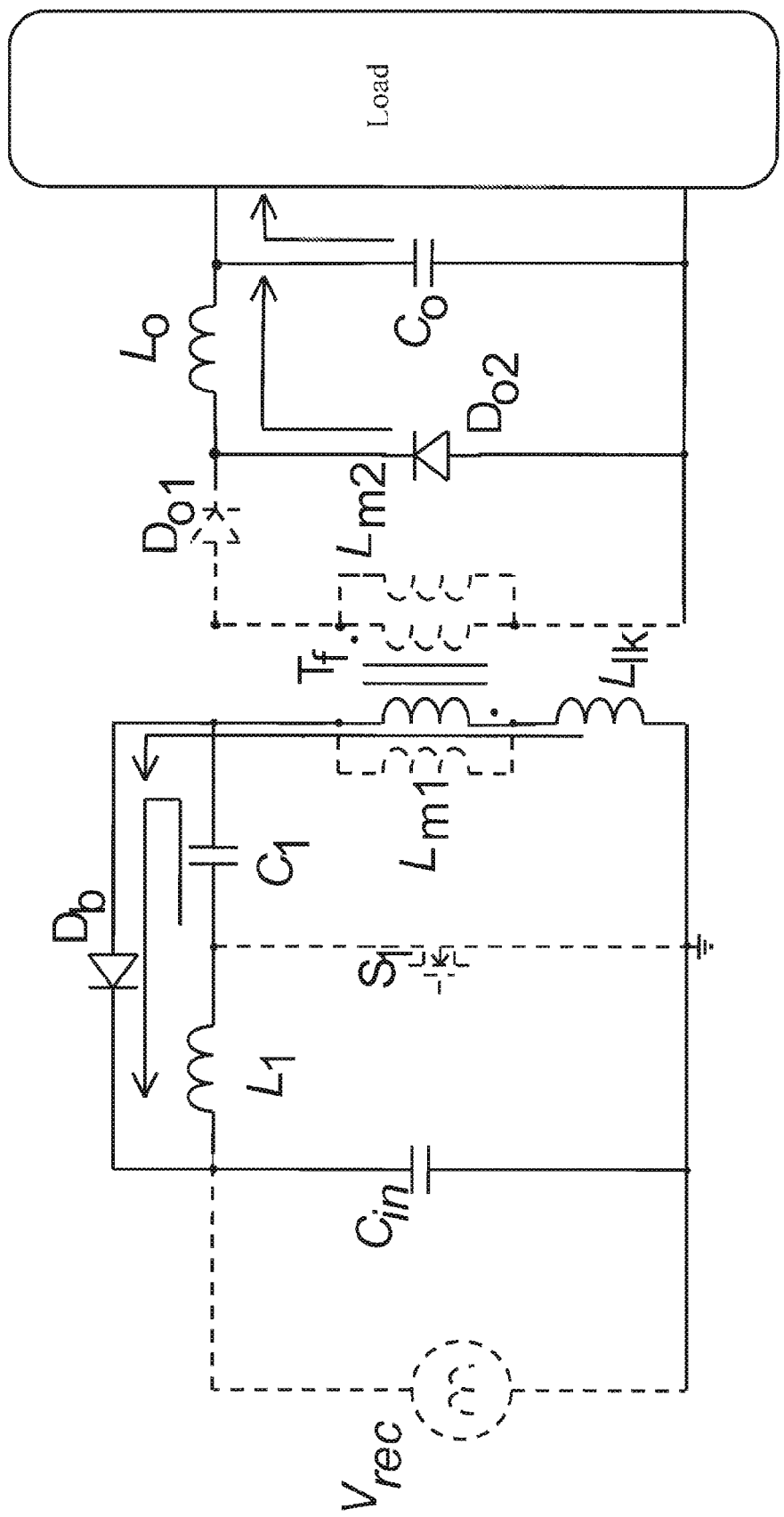
Figure 13C:
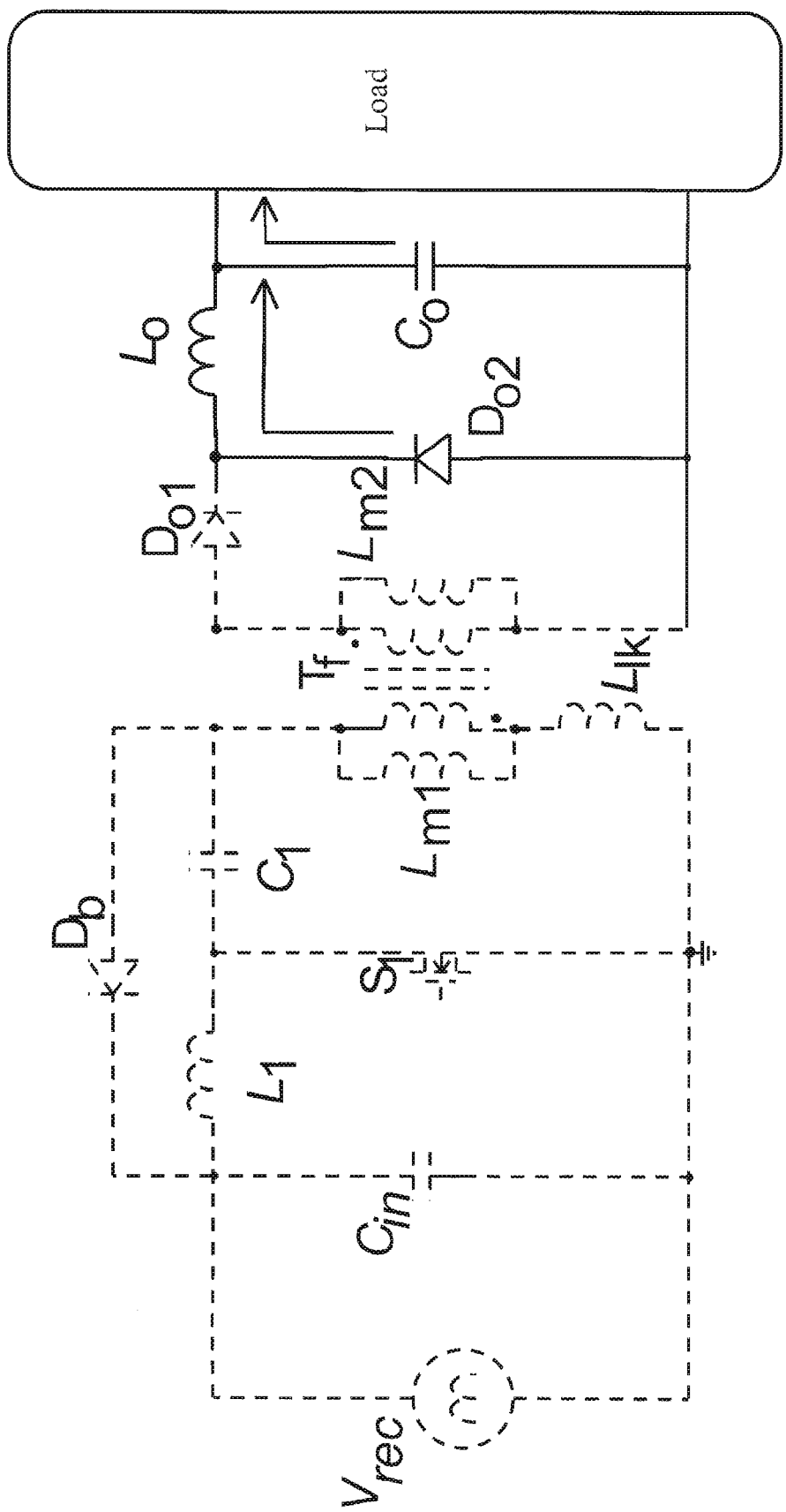
Figure 14:
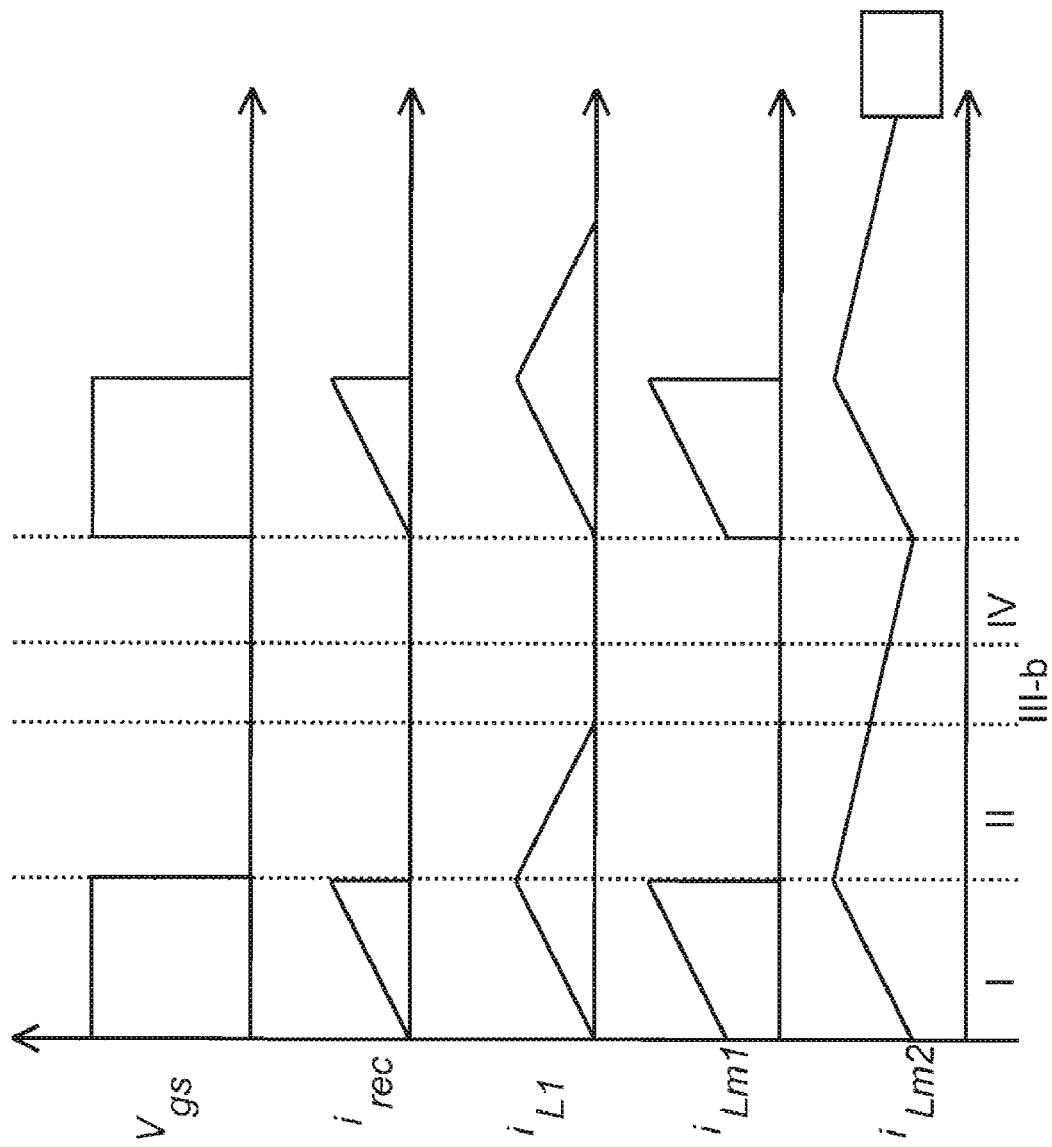
FIG. 14 shows a theoretical waveform of the single-stage isolated high power factor AC/DC converter with a leakage inductor energy recovery function according to another embodiment of the present invention, in which a buck-boost circuit operates in the DCM and a forward converter operates in the CCM.

When the buck-boost circuit operates in the DCM and the forward converter operates in the CCM, the circuit may have three operating modes in each high-frequency cycle according to the conducting state of the power switch elements and diodes. An equivalent circuit of each operating mode is as shown in FIG. 13A to FIG. 13C, and a theoretical waveform is as shown in FIG. 14.

(1) Operating Mode I (S1 is Turned on):

When the switch S1 is turned on, the rectified input voltage is applied across the inductor L1, the inductor current iL1 starts to increase linearly from zero, and the increasing rate of the inductor current iL1 is proportional to the input voltage Vrec. Meanwhile, the voltage on the capacitor C1 of the buck-boost circuit is applied across the magnetizing inductor Lm1 at the primary side of the transformer Tf of the forward converter, and the energy is coupled to the output inductor Lo and the capacitor Co and the load 350 at the secondary side of the transformer Tf of the forward converter. The inductor current iLo also starts to increase linearly, and meanwhile, the inductor current iLm1 induces a current that is proportional to the inductor current iLo (according to the turns ratio of the transformer) along with the transformer. At this time, the inductor current iL1 and the inductor current iLm1 flow through the switch S1 at the same time. At the instant when the switch S1 is cut off, both the inductor current iL1 and the inductor current iLo (the inductor current iLm1) reach peaks of this cycle.

(2) Operating Mode II (S1 is Cut Off):

When the switch S1 is cut off, the inductor L1 maintains the current path, the energy stored in the inductor L1 is released to the capacitor C1 via the rectifier Db, and the inductor current iL1 starts to drop from the peak. Meanwhile, the output inductor Lo delivers the energy to the output capacitor Co and the load 350 via the output rectifier Do2, and the inductor current iLo also starts to drop from the peak. In addition, at this time, the transformer Tf of the forward converter may also be demagnetized by the rectifier Db, and the energy may be returned to the input capacitor Cin. As the buck-boost circuit operates in the DCM and the forward converter operates in the CCM at this time, only the inductor current iL1 will drop to zero. When the inductor current iL1 drops to zero, Operating Mode III is entered.

(3) Operating Mode III (after iL1 Drops to Zero):

As the inductor current iL1 has dropped to zero in Operating Mode II, the inductor current iLo drops continuously at this time. When the switch S1 is turned on again, the circuit repeats the operation of Operating Mode I.

If the buck-boost circuit is designed to operate in the DCM, the anticipated circuit functions (PFC, electrical isolation, voltage level adjustment, and the like) will not be affected, no matter the forward converter operates in the DCM or the CCM. Moreover, the leakage inductor L1$k$ of the transformer is theoretically far smaller than the magnetizing inductor of the transformer, so the energy stored in the leakage inductor L1$k$ will be released to the input capacitor Cin in a very short time. In a specific embodiment, the energy in the leakage inductor L1$k$ can be completely returned to the input capacitor Cin as long as the off time of the switch S1 is longer than one quarter of the resonant period of the leakage inductor L1$k$ and the input capacitor Cin.

Figure 15A:
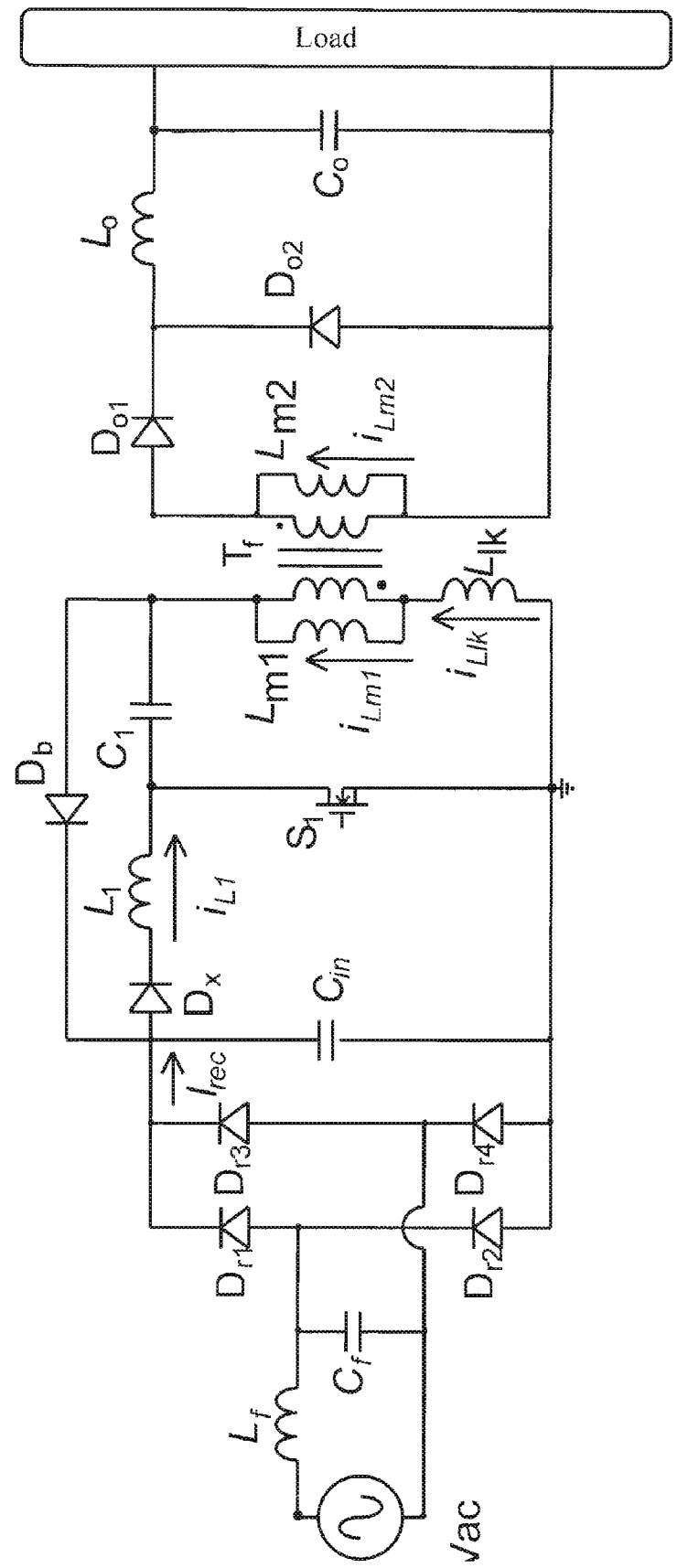
FIG. 15A to FIG. 15B show a single-stage isolated high power factor AC/DC converter with a leakage inductor energy recovery function according to another embodiment of the present invention.
Figure 15B:
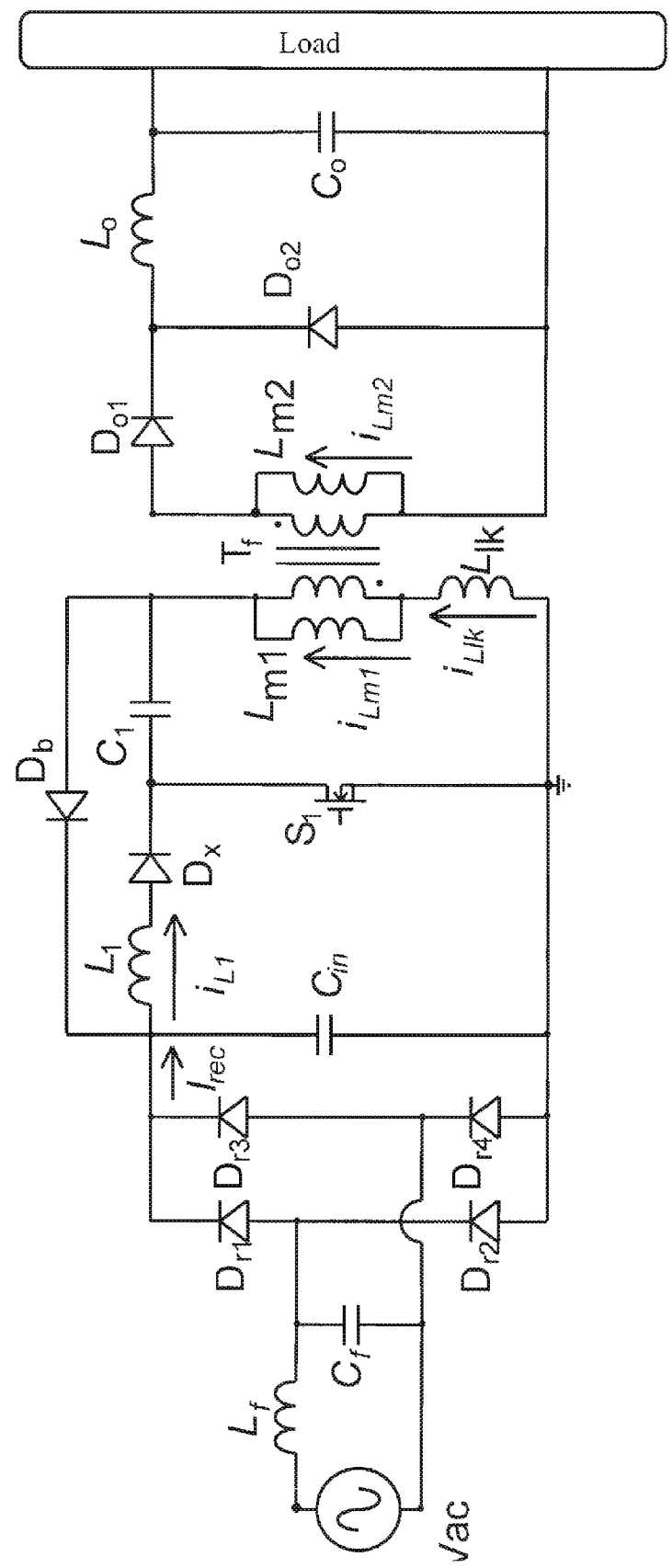

In an embodiment of the present invention, in order to achieve the PFC, the inductor L1 is designed to operate in the DCM, and when the duty ratio of the switch is less than 50%, the voltage on the capacitor C1 may be lower than the input voltage. After the switch is cut off, as the inductor L1 is designed to operate in the DCM, the inductor current iL1 will drop to zero before the switch is turned on again. Once the voltage on the capacitor C1 is higher than the peak of the input voltage, VC1-Vin is reversed across the inductor L1, turning the inductor current iL1 to a negative value, which may lead to an abnormal circuit operation. In this case, a rectifier Dx such as a diode may be serially connected to either side of the inductor L1, as shown in FIG. 15A to FIG. 15B, so as to avoid the possible reversion of the inductor current iL1.

Figure 16A:
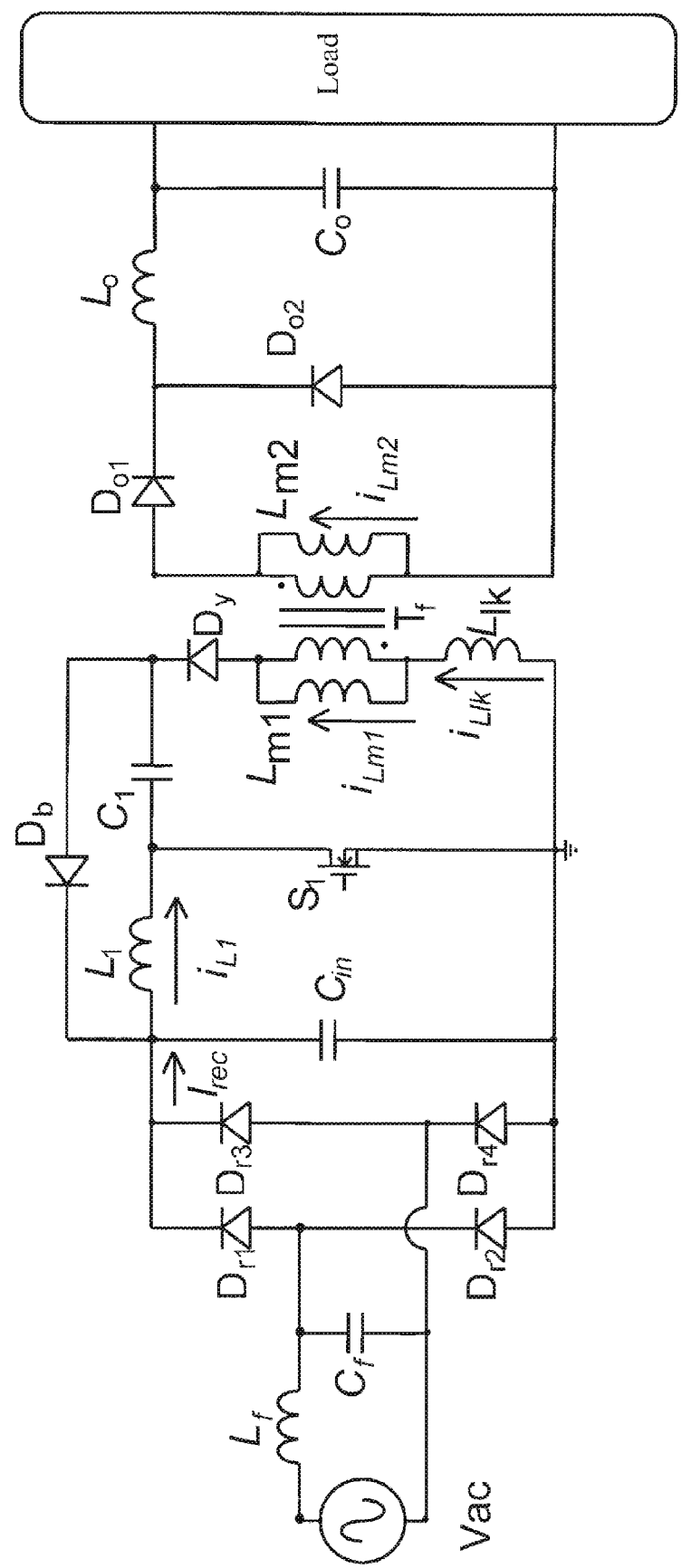
FIG. 16A to FIG. 16B show a single-stage isolated high power factor AC/DC converter with a leakage inductor energy recovery function according to another embodiment of the present invention.
Figure 16B:
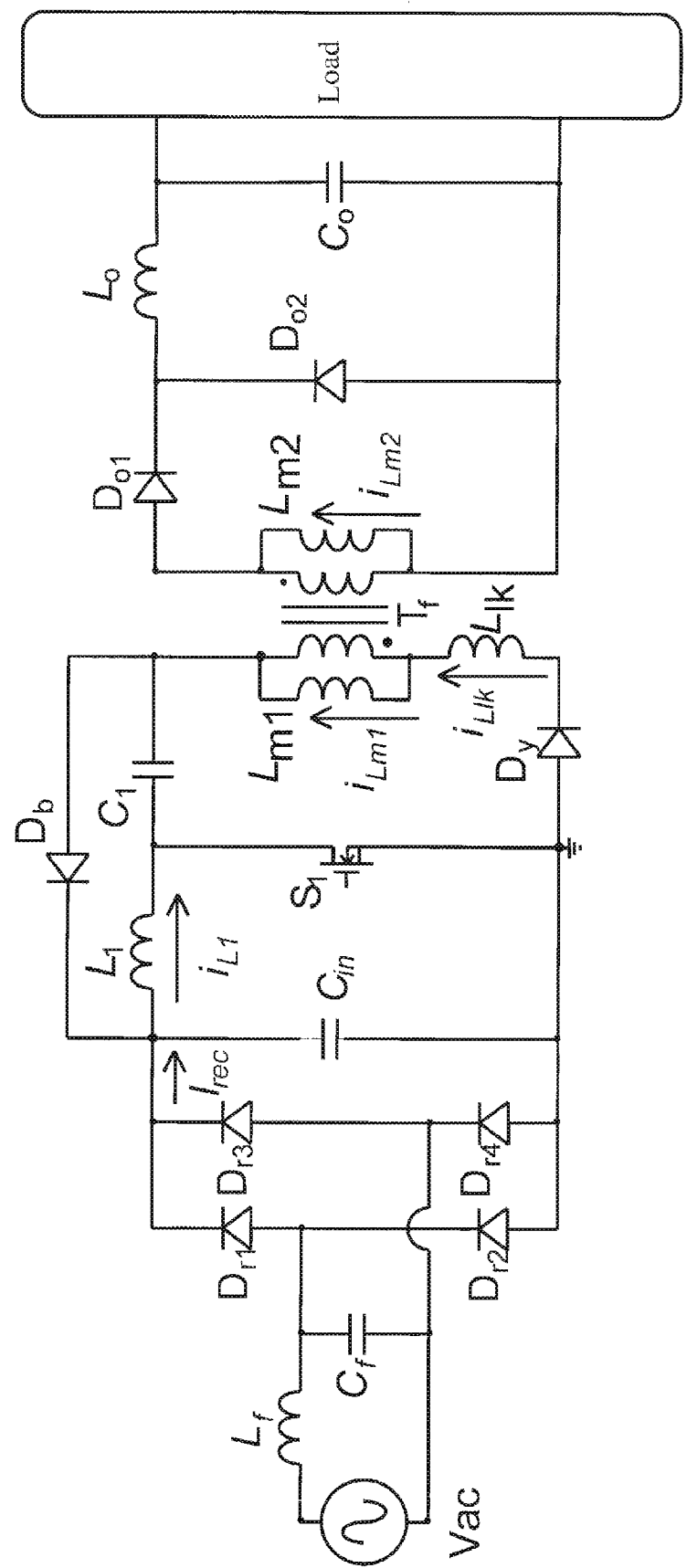

In an embodiment of the present invention, as the peak of the inductor current iL1 is proportional to the input voltage, the inductor current iL1 may drop to zero earlier or later than the inductor current iL1$k$. If the inductor current iL1$k$ drops to zero earlier than the inductor current iL1, the inductor current iL1 flows through the rectifier Db and charges the capacitor C1. Once the rectifier Db is turned on, the voltage Vrec (the rectified input voltage) on the input capacitor Cin is reversed across the primary side of the transformer, turning the inductor current iLm1 to a negative value, which may lead to an abnormal circuit operation. In this case, a rectifier Dy such as a diode may be serially connected to either side of the primary side of the transformer Tf, as shown in FIG. 16A to FIG. 16B, so as to avoid the possible reversion of the inductor current iLm1. In embodiments of FIG. 15A to FIG. 15B and FIG. 16A to FIG. 16B, the rectifier Dy is serially connected respectively. In another embodiment, either side of the inductor L1 and either side of the primary side of the transformer Tf may also be respectively serially connected to one rectifier at the same time.

In another embodiment, for example, the embodiment in FIG. 3, the inductor L1 of the buck-boost circuit shares an iron core with the transformer Tb of the flyback converter, so as to reduce a magnetic element, thus further reducing the cost.

In still another embodiment, for example, the embodiment in FIG. 10, the inductor L1 of the buck-boost circuit shares an iron core with the output inductor Lo of the forward converter, or the inductor L1 of the buck-boost circuit shares the iron core with the transformer Tf of the forward converter, so as to reduce a magnetic element, thus further reducing the cost.

Therefore, in the present invention, the buck-boost circuit is integrated with the flyback converter or the forward converter, and the energy stored in the leakage inductor of the transformer of the flyback converter is returned to the input capacitor by using the free-wheeling diode of the buck-boost circuit through delicate element arrangement. As such, the problem caused by the leakage inductor of the transformer of the flyback converter can be solved without using any additional element, thus improving the circuit efficiency. The path for demagnetizing the transformer of the forward converter is provided by using the free-wheeling diode of the buck-boost circuit, so as to return the energy to the input capacitor. As such, the problem that the transformer of the forward converter needs an additional demagnetizing winding can be solved without using any other additional element or an additional demagnetizing winding, thus reducing the cost and the design difficulty and improving the circuit efficiency.

The single-stage isolated high power factor AC/DC converter of the present invention only needs one control circuit and one active power switch S1, can be simply controlled and easily achieved, is applicable to nearly all converter control methods, and can control the output power through pulse width modulation (PWM), pulse frequency modulation (PFM), hysteretic control, constant on/off time) and the like. The control circuit is simple and can be easily achieved. When the inductor of the buck-boost circuit operates in the DCM, the power factor may be unity. When the inductor of the buck-boost circuit operates in the CCM, the PFC can be achieved. However, since the operation in the CCM requires complex control, only the DCM is analyzed herein. Moreover, the functions of electrical isolation conforming to the safety specifications, multi-winding output, and voltage level adjustment can be achieved by designing a suitable flyback or forward transformer. As such, the circuit complexity is reduced, the circuit efficiency is improved, and the cost is reduced, thus improving the competitiveness of the converter.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A single-stage isolated high power factor AC/DC converter with a leakage inductor energy recovery function, comprising:
    a buck-boost circuit, for step-down or step-up a power supply and comprising an input inductor, a first capacitor, and a first rectifier, wherein the input inductor is serially connected to the first capacitor, and the first rectifier is connected to the serially connected input inductor and first capacitor in parallel;
    an input capacitor, one end of which is electrically connected to the input inductor, and an other end of which is electrically connected to a ground;
    a transformer, comprising a primary side and a secondary side, for transforming the stepped-down or stepped-up power supply, wherein one end of the primary side is electrically connected to the first rectifier and the first capacitor and an other end of the primary side is electrically connected to the ground;
    a switch, one end of which is electrically connected to the input inductor and the first capacitor, and an other end of which is electrically connected to the ground, wherein when the switch is cut off, the buck-boost circuit provides an energy recovery path to return energy stored in a leakage inductor of the transformer to the input capacitor; and
    an output circuit, electrically connected to the secondary side of the transformer, for outputting the power supply transformed by the transformer.

2. The AC/DC converter according to claim 1, wherein when the switch is cut off, the first rectifier of the buck-boost circuit forms the energy recovery path.

3. The AC/DC converter according to claim 1, further comprising a second rectifier connected to one side of the input inductor of the buck-boost circuit.

4. The AC/DC converter according to claim 1, further comprising a second rectifier connected to a primary side of the transformer.

5. The AC/DC converter according to claim 1, further comprising at least two second rectifiers, respectively connected to one side of the input inductor of the buck-boost circuit and one side of a primary side of the transformer.

6. The AC/DC converter according to claim 1, wherein the input inductor of the buck-boost circuit shares a same iron core with the transformer.

7. The AC/DC converter according to claim 1, wherein the output circuit is formed by an output rectifier and an output capacitor.

8. The AC/DC converter according to claim 1, wherein the output circuit is formed by two output rectifiers, an output capacitor, and an output inductor.

9. The AC/DC converter according to claim 8, wherein the input inductor shares a same iron with the output inductor.

10. The AC/DC converter according to claim 1, further comprising a rectification circuit electrically connected to the input capacitor, for rectifying the power supply.

11. The AC/DC converter according to claim 10, wherein the rectification circuit comprises at least one rectifier.

12. The AC/DC converter according to claim 10, further comprising a filter circuit electrically connected to the rectification circuit.

13. The AC/DC converter according to claim 12, wherein the filter circuit is formed by a filter inductor and a filter capacitor.

* * * * *